(12) United States Patent
Augenstein

(10) Patent No.: US 10,762,458 B1
(45) Date of Patent: Sep. 1, 2020

(54) SATELLITE SCHEDULING SYSTEM

(71) Applicant: Planet Labs, Inc., San Francisco, CA (US)

(72) Inventor: Sean Augenstein, Palo Alto, CA (US)

(73) Assignee: Planet Labs, Inc., San Francisco, CA (US)

( * ) Notice: Subject to any disclaimer, the term of this patent is extended or adjusted under 35 U.S.C. 154(b) by 826 days.

(21) Appl. No.: 14/522,701

(22) Filed: Oct. 24, 2014

Related U.S. Application Data

(60) Provisional application No. 61/900,276, filed on Nov. 5, 2013, provisional application No. 61/895,310, filed on Oct. 24, 2013.

(51) Int. Cl.
*G06Q 10/06* (2012.01)
*B64G 1/10* (2006.01)
*G06F 16/22* (2019.01)
*G06F 9/00* (2006.01)

(52) U.S. Cl.
CPC ..... *G06Q 10/06314* (2013.01); *B64G 1/1021* (2013.01); *B64G 1/1078* (2013.01); *B64G 1/1085* (2013.01); *G06F 16/22* (2019.01); *B64G 2001/1028* (2013.01)

(58) Field of Classification Search
CPC ............ G06Q 10/10; G06Q 10/06316; B64G 1/1021; B64G 1/1078
See application file for complete search history.

(56) References Cited

U.S. PATENT DOCUMENTS 5,887,174 A * 3/1999 Simons ................ G06F 8/445 712/216
5,911,389 A 6/1999 Drake
5,978,653 A 11/1999 Taylor et al.
5,987,363 A 11/1999 Quan et al.
(Continued)

FOREIGN PATENT DOCUMENTS

CN 102322850 1/2012
CN 102354288 2/2012
(Continued)

OTHER PUBLICATIONS

J. C. Pemberton et al., "On the Need for Dynamic Scheduling of Imaging Satellites", Department of Computer Science, Drexel University, Philadelphia, PA, Pecora 15/Land Satellite Information IV/ISPRS Commission I/FIEOS 2002 Conference Proceedings. (Year: 2002).*
(Continued)

*Primary Examiner* — Pan G Choy
(74) *Attorney, Agent, or Firm* — Dority & Manning, PA

(57) ABSTRACT

Systems and methods are provided for scheduling objects having pair-wise and cumulative constraints. The systems and methods presented can utilize a directed acyclic graph to increase or maximize a utilization function. The objects can comprise satellites in a constellation of satellites. In some implementations, the satellites are imaging satellites, and the systems and methods for scheduling can use human collaboration to determine events of interest for acquisition of images. In some implementations, dominant edges are removed from the directed acyclic graph. In some implementations, dynamic weights are assigned to nodes associated with downlink events in the directed acyclic graph.

12 Claims, 11 Drawing Sheets

(56) References Cited

U.S. PATENT DOCUMENTS

| | | | | |
|---|---|---|---|---|
| 6,154,736 | A * | 11/2000 | Chickering | G06N 7/005 706/59 |
| 6,241,192 | B1 | 6/2001 | Kondo | |
| 6,491,257 | B1 | 12/2002 | Emmons, Jr. et al. | |
| 6,502,790 | B1 | 1/2003 | Murphy | |
| 6,512,920 | B1 | 1/2003 | Yaoya | |
| 6,606,529 | B1 | 8/2003 | Crowder, Jr. et al. | |
| 6,738,346 | B1 * | 5/2004 | Prieto, Jr. | H04B 7/1858 370/229 |
| 7,002,918 | B1 | 2/2006 | Prieto, Jr. et al. | |
| 7,542,829 | B2 | 6/2009 | Lee et al. | |
| 7,995,810 | B2 * | 8/2011 | Li | G06K 9/4638 382/128 |
| 8,881,079 | B1 * | 11/2014 | Pan | G06F 30/3312 716/111 |
| 8,913,528 | B2 * | 12/2014 | Cheng | H04L 5/0073 370/278 |
| 8,977,619 | B2 * | 3/2015 | Mann | G06Q 10/06314 707/736 |
| 8,997,619 | B2 | 4/2015 | Sasaki et al. | |
| 9,126,700 | B2 | 9/2015 | Ozkul et al. | |
| 9,132,925 | B2 | 9/2015 | Korb | |
| 9,277,532 | B2 * | 3/2016 | Guo | H04W 72/005 |
| 10,474,976 | B2 * | 11/2019 | Clancy | H04B 7/18502 |
| 10,532,831 | B2 * | 1/2020 | Giraud | H04B 7/195 |
| 2003/0095181 | A1 | 5/2003 | LeCompte | |
| 2004/0158832 | A1 * | 8/2004 | Chechik | G01C 11/025 718/102 |
| 2008/0189094 | A1 * | 8/2008 | Adir | G01R 31/318371 703/14 |
| 2008/0244606 | A1 * | 10/2008 | Wylie | G06F 9/5038 718/104 |
| 2008/0255908 | A1 * | 10/2008 | Smith | G06Q 10/06316 705/7.26 |
| 2009/0171700 | A1 * | 7/2009 | O'Sullivan | G06Q 10/02 705/5 |
| 2010/0119053 | A1 | 5/2010 | Goeldi | |
| 2010/0309313 | A1 | 12/2010 | Antikid S | |
| 2010/0311417 | A1 | 12/2010 | Korb et al. | |
| 2011/0115793 | A1 | 5/2011 | Grycewicz | |
| 2011/0188548 | A1 | 8/2011 | Antikidis | |
| 2011/0268158 | A1 * | 11/2011 | Miller | H04B 7/2041 375/138 |
| 2012/0029812 | A1 | 2/2012 | Abdulaziz et al. | |
| 2012/0036085 | A1 | 2/2012 | Srivastava et al. | |
| 2012/0155329 | A1 | 6/2012 | Shaffer et al. | |
| 2012/0188372 | A1 | 7/2012 | Ozkul et al. | |
| 2012/0254887 | A1 | 10/2012 | Rodriguez | |
| 2012/0257818 | A1 * | 10/2012 | Bertozzi | G06K 9/6268 382/155 |
| 2013/0086072 | A1 | 4/2013 | Peng et al. | |
| 2013/0124079 | A1 * | 5/2013 | Olivier | B64G 3/00 701/301 |
| 2013/0275036 | A1 | 10/2013 | Oliver et al. | |
| 2014/0027576 | A1 * | 1/2014 | Boshuizen | B64G 1/1085 244/158.6 |
| 2014/0039963 | A1 * | 2/2014 | Augenstein | G06Q 10/06314 705/7.24 |
| 2014/0040282 | A1 | 2/2014 | Mann et al. | |
| 2014/0099884 | A1 | 4/2014 | Lozano et al. | |
| 2016/0155073 | A1 * | 6/2016 | Augenstein | G06F 16/29 705/7.24 |
| 2016/0232032 | A1 * | 8/2016 | Azvine | G06F 9/4881 |

FOREIGN PATENT DOCUMENTS

| | | |
|---|---|---|
| CN | 102867107 | 2/2012 |
| CN | 103336715 | 10/2013 |
| EP | 0992429 | 4/2000 |
| EP | 2664989 | 11/2013 |
| WO | WO 97/26187 | 7/1997 |
| WO | WO 2004/048197 | 6/2004 |
| WO | WO 2011/089477 | 7/2011 |
| WO | WO 2014/022810 | 2/2014 |

OTHER PUBLICATIONS

Angelis et al., DAG Scheduling for Grid Computing Systems:, University of Udine—Italy, Department of Mathematics and Computer Science, 2006. (Year: 2006).*

Angelis et al., (hereinafter: Angelis), "DAG Scheduling for Grid Computing Systems", University of Udine—Italy, Department of Mathematics and Computer Science, 2006. (Year: 2006).*

Sean Augenstein, "Optimal Scheduling of Earth-Image Statellites with Human Collaboration vis Directed Acyclic Graphs", Skybox Imaging, 1061 Tera Bella Ave, Mountain View, CA 94043, 2014. (Year: 2014).*

J. C. Pemberton et al., "On the Need for Dynamic Scheduling of Imaging Satellites", Pecora 15/Land Satellite Information IV/ISPRS Commisision I/FIEOS, 2002 Conference Proceedings. (Year: 2002).*

Wikipedia article, "SIMD", old revision dated Dec. 3, 2013, retrived on Mar. 30, 2017, https://en.wikipedia.org/w/index.php?title=SIMD&oldid=584315722, 7 pages.

Wikipedia article, "Streaming SIMD extensions", old revision dated Dec. 27, 2013, retrieved on Mar. 30, 2017, https://en.wikipedia.org/w/index.php?title=Streaming_SIMD_Extensions&oldid=587972486, 5 pages.

PCT Search Report and Written Opinion in PCT/US2013/053492, dated May 21, 2014—18 pages.

Invitation to Pay Additional Fees in PCT/US2013/053492, dated Feb. 18, 2014—8 pages.

Bataille, "Efficiency and Fairness When Sharing the Use of a Satellite", Proceedings of Fifth International Symposium on Artificial Intelligence, Robotics and Automation in Space, Noordwijk, the Netherlands, Jun. 1-3, 1999, pp. 465-470.

Bensana, "Testing Spacecraft Autonomy with AGATA", Proceedings of the 9th International Symposium on Artificial Intelligence, Robotics, and Automation for Space, Los Angeles, California, Feb. 25-29, 2008—9 pages.

Bouveret et al., "New Constraint Programming Approaches for the Computation of Leximin-Optimal Solutions in Constraint Networks", Proceedings of the 20th International Joint Conference on Artificial Intelligence, Hyderbad, India, Jan. 12, 2007, pp. 62-67.

Chevaleyre et al., "Issues in Multiagent Resource Allocation", Informatica, vol. 30, No. 1, 2006, pp. 331.

Directed Acyclic Graph, http://en.wikipedia.org/wiki/Directed_acyclic_graph, Retrieval Date Aug. 7, 2014—10 pages.

Endriss et al., "Proceedings of the 1st International Workshop on Computational Social Choice", University of Amsterdam, Dec. 2006, 519 pages.

Gabrel et al., "A New Single Model and Derived Algorithms for the Satellite Shot Planning Problem Using Graph Theory Concepts", Annals of Operation Research, vol. 69, 1997, pp. 115-134.

Lemaitre et al., "How to Manage the New Generation of Agile Earth Observation Satellites?", International Conference on Space Operations, Toulouse, France, Jun. 2000—9 pages.

Lemaitre et al., "Selecting and Scheduling Observations of Agile Satellites", Aerospace Science and Technology, vol. 6, No. 5, Jul. 1, 2002, pp. 367-381.

Lemaitre et al., "Sharing the Use of Earth Observation Satellites", Proceedings of the 3rd NASA International Workshop on Planning and Scheduling for Space, Houston, Texas, Oct. 27-29, 2002—5 pages.

Lemaitre et al., "Towards the Formal Verification of the Functional Architecture of Autonomous Satellite Onboard Flight Software", 3rd National Conference on Control Architectures of Robots, Bourges, May 29-30, 2008, 8 pages.

Pralet et al., "Controller Synthesis for Autonomous Systems: A Constraint-Based Approach", 10th International Symposium on Artificial Intelligence, Robotics and Automation in Space, Saporo, Japan, Aug. 29-Sep. 1, 2010,—8 pages.

(56) References Cited

OTHER PUBLICATIONS

Verfaillie et al., "How to Model Planning and Scheduling Problems Using Constraint Networks on Timelines", The Knowledge Engineering Review, vol. 25, Special Issue 3, Sep. 2010, pp. 319-336.
Third Party Submission—Concise Description of Relevance, Mar. 18, 2015—11 pages.
Capderou, "Orbit and Ground Track of a Satellite, Chapter 5 of Satellites: Orbits and Missions," Springer, 2005, pp. 175-263.
Carrel et al., "An Evolutionary Algorithm for Near-Optimal Autonomous Resource Management," Proc. of the $8^{th}$ International Symposium on Artifical Intelligence, Robotics and Automation in Space, Munich, Germany, Sep. 5-8, 2005—8 pages.
Christophe et al., "Remote Sensing Processing: From Multicore to GPU," IEEE Journal on Selected Topics in Applied Earth Observations and Remote Sensing, vol. 4, No. 3, Sep. 2011, pp. 643-652.
Hwang et al., "Development of Multi Remote Sensing Satellites Mission Planning System,"The $28^{th}$ Asian Conference on Remote Sensing, Kuala Lumpur, Malaysia, Nov. 12-16, 2007, vol. 2 of 3—6 pages.
Hwang et al., "Multi-Objective Optimization for Multi-Satellite Scheduling System," The 31th Asian Conference on Remote Sensing, Hanoi, Vietnam, 2010—6 pages.
Li et al., "An Analytical Model to Predict the Probability Density Function of Elevation Angles for LEO Satellite Systems," IEEE Communications Letters, vol. 6, No. 4, Apr. 2002, pp. 138-140.
Mai et al., "Conversion of North American Aerospace Defense Command Elements to Epicycle Elements," Journal of Guidance, Control, and Dynamics, vol. 24, No. 2, Mar.-Apr. 2001, pp. 406-408.
Wu et al., "ImPredict: a Fast Image Prediction Software and Its Application in the SSTL off-axis Image Scheduling System," 15th AIAA/USU Conference on Small Satellites, 2001—10 pages.
Kim et al., "Generation of Cloud-free Imagery Using Landsat-8," published as paper SC02-0828 in The 34th Asian Conference on Remote Sensing, Proceedings, ACRS 2013, Oct. 20-24, 2013, Bali, Indonesia—7 pages.
Yeh et al., "Geometry Analysis Based Genetic Algorithm for Satellite Imaging Scheduling," The 32th Asian Conference on Remote Sensing (ACRS 2011), Oct. 3-7, 2011, Taipei, Chinese Taipei—6 pages.
Beaumet et al., "Decision-Making On-Bard an Autonomous Agile Earth-Observing Satellite", International Conference on Automated Planning and Scheduling, ICAPS '08, Sep. 17, 2008—7 pages.
Bellman, "On a Routing Problem", Notes, vol. XVI, No. 1, 1956, pp. 87-90.
Bogosian, "Image Collection Optimization in the Design and Operation of Lightweight, Low-Areal-Density Space telescopes", Master's Thesis, Massachusetts Institute of Technology, May 23, 2008, pp. 1-155.
Dijstra, "A Note on Two Problems in Connexion with Graphs", Numerische Mathematic, vol. 1, No. 1, Jun. 1959, pp. 269-271.
Ford et al., "Flows in Networks", The Rand Corporation, Aug. 1962.
Gabrel, "Strengthened 0-1 Linear Formulation for the Daily Satellite Mission Planning", Journal of Combinatorial Optimization, vol. 1, No. 3, Jan. 11, 2006, pp. 341-346.
Gabrel et al., "Enumeration and Interactive Selection of Efficient Paths in a Multiple Criteria Graph for Scheduling an Earth Observing Satellite", European Journal of Operational Research, vol. 139, No. 3, pp. 533-542.
Gabrel et al., "Mathematical Programming for Earth Observation Satellite Mission Planning", Chapter 7, Operations Research in Space and Air, 2003, pp. 103-122.
Harrison et al., "Task Scheduling for Satellite Based Imagery", In Proceedings of the Eighteenth Workshop of the UK Planning and Scheduling Special Interest Group, vol. 78, University of Salford, UK, Dec. 1999.
Mai, Yan et al., "Fast algorithm for prediction of satellite imaging and communication opportunities", Journal of Guidance, Control, and Dynamics, AIAA, vol. 24 No. 6, Nov.-Dec. 2001, pp. 1118 to 1124.
Schilling, Klaus, "Mission analyses for low-earth-observation missions with spacecraft formations", NATO/OTAN publication RTO-EN-SCI-209, Paper 1, Apr. 2009, 26 pages, downloaded from https://www.cso.nato.int/pubs/rdp.asp?RDP=RTO-EN-SCI-209.
Steyn, Willem H., "A view finder control system for an earth observation satellite", Aerospace Science and Technology, vol. 10, 2006, pp. 248 to 255.
Wu, Shu-Fan et al., "Fast prediction algorithms of satellite imaging opportunities with canted camera and attitude controls", AIAA Guidance, Navigation, and Control Conference and Exhibit, Aug. 6-9, 2001, Montreal, Canada, Paper AIAA-2001-4270 (A01-37137), 11 ages.

\* cited by examiner

SATELLITE SCHEDULING SYSTEM

PRIORITY CLAIM

This application claims the benefit of priority of U.S. Provisional Patent Application Ser. No. 61/895,310, filed Oct. 24, 2014, titled "Satellite Scheduling System Including Human Collaboration," which is incorporated herein by reference. This application further claims the benefit of priority of U.S. Provisional Patent Application Ser. No. 61/900,276, filed Nov. 5, 2013, titled "Satellite Scheduling System Using Graphs," which is incorporated herein by reference.

BACKGROUND

Scheduling problems appear in many applications such as satellite scheduling, airline crew scheduling, vehicle routing, traveling salesmen problems, and the like. Applications such as these involve allocating resources to activities over time. Typically, resources are scarce and constrained in various ways, e.g., in the capacity of resources and/or the order of activities. Solving a typical scheduling problem can involve creating a schedule of activities that satisfies the constraints and is optimal according to some criterion. Implementing a schedule can include finding a desirable solution to a scheduling problem accounting for various constraints, communicating the desirable solution to the appropriate people or systems, and executing the schedule as communicated.

SUMMARY

Aspects and advantages of embodiments of the present disclosure will be set forth in part in the following description, or may be learned from the description, or may be learned through practice of the embodiments.

One example aspect of the present disclosure is directed to a system for scheduling events for a constellation of imaging satellites. The system includes non-transitory data storage configured to store satellite properties information corresponding to characteristics of one or more imaging satellites in the constellation of imaging satellites. The system includes one or more computing devices in communication with the data storage. The one or more computing devices are configured to execute an order management system configured to produce or receive requests for an image collection event and an orbit analysis system configured to identify one or more imaging satellites in the constellation of imaging satellites which will be positioned over a region suitable to perform a requested image collection event. The one or more computing devices a further configured to execute a maintenance system configured to produce requests for onboard maintenance for imaging satellites in the constellation of imaging satellites and a satellite scheduling system configured to receive event requests and satellite properties and user input relating to changes to one or more of the event requests and to produce a near-optimal schedule of events that does not violate constraints of the constellation of imaging satellites. The near-optimal schedule can take into account at least in part the received user input. The system can further include a satellite control system configured to receive the near-optimal schedule of events and convert the near-optimal schedule of events to control instructions for transmission to the one or more imaging satellites in the constellation of imaging satellites.

Another example aspect of the present disclosure is directed to a method of scheduling events for a constellation of imaging satellites. The method includes receiving, by one or more computing devices, a request for an image collection event and identifying, by the one or more computing devices, one or more imaging satellites in the constellation of imaging satellites which will be positioned over a region suitable to perform a requested image collection event. The method can further include receiving, by the one or more computing devices, data indicative of a plurality of event requests and data indicative of satellite properties. The method can further include receiving, by the one or more computing devices, data indicative of user input relating to changes to one or more of the event requests and producing, by the one or more computing devices, a near-optimal schedule of events that does not violate constraints of the constellation of imaging satellites. The near-optimal schedule of events can take into account at least in part the user input relating to changes to one or more of the event requests. The method can further include converting, by the one or more computing devices, the near optimal schedule of events to control instructions for transmission to one or more imaging satellites in the constellation of imaging satellites.

Other aspects of the present disclosure are directed to systems, apparatus, tangible non-transitory computer-readable media, user interfaces and devices for scheduling events for objects, such as imaging satellites.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures.

FIG. 12 depicts an example DAG after a node has been forced in.

DETAILED DESCRIPTION

Figure 1:
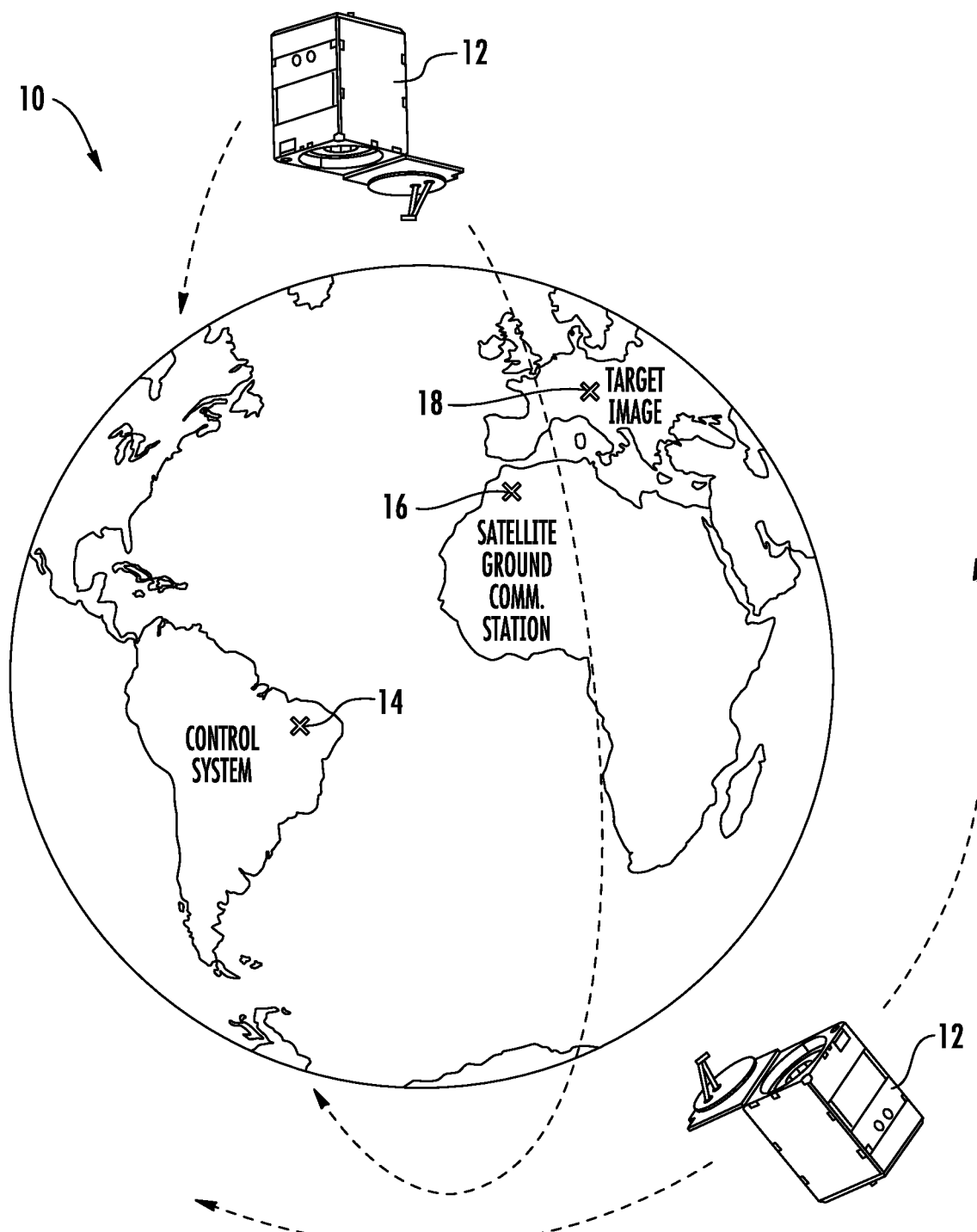
FIG. 1 illustrates a representation of an example constellation of imaging micro-satellites in a low-earth orbit, a control system, a ground communication system, and a target area.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure relate to systems and methods for scheduling satellites, for example a constellation of imaging satellites. Embodiments of the systems and methods can be used for scheduling multiple events with interdependent constraints, and more particularly for producing schedules in a relatively fast and efficient manner. In some implementations, the disclosed systems and methods can be used to produce schedules of events for a constellation of satellites.

For a constellation of imaging satellites, events which can be scheduled include image acquisition tasks, maintenance tasks, communication tasks, and the like. A scheduling system can generate a schedule of events by incorporating and analyzing a number of inputs, parameters, and variables to produce timely, efficient, and valuable use of the satellites in the constellation.

In some implementations, systems and methods are provided for quickly scheduling one or more satellites having pair-wise and cumulative constraints. The systems and methods presented can utilize directed acyclic graphs (DAGs) to increase or maximize a utilization function. The directed acyclic graphs can include edges encoding constraints associated with the satellites. A schedule of events can be determined by identifying a path through the DAG, such as a highest weighted or maximum cost path through the DAG.

In some embodiments, a computerized scheduling engine can be used to schedule a constellation of satellites for increased or optimum performance and also (optionally) use human input, which can provide late-breaking changes affecting the schedule (e.g., imagining target desirability). The scheduling engine can incorporate human actions into its decision-making protocol, for example, by incorporating the human actions into a DAG used for scheduling optimization.

In some implementations, edges of the DAG that may be determined to be not part of the longest path through the DAG are not traversed (and/or not included in the DAG), which may advantageously save memory (storage space) and/or computing time. In some implementations, weights of downlink events (e.g., communication of imagery from the satellite to a ground link) can be separately weighted and may be interleaved among imaging events (e.g., taking an image of a region below the satellite). The weights may be dynamically determined based on one or more heuristics based at least partly on one or more of the time necessary to downlink all imagery on board the satellite, the time available to downlink data, etc. In some implementations, the weight(s) for downlink event(s) and the weight(s) for imaging event(s) can be separated by an order of magnitude.

Example embodiments of the present disclosure can be used to manage a network of imaging satellites to quickly respond to image acquisition requests. Requests for images can change rapidly and it is advantageous to update schedules of events on each satellite in near real-time to reduce or eliminate missed opportunities for acquiring timely imagery or performing other time-sensitive tasks. In addition, example aspects of the present disclosure can be used to efficiently utilize the resources of the imaging satellites in the constellation. Balancing a desire for rapid schedule updates and efficient satellite use, a scheduling system can advantageously be configured to produce near optimal schedules of events which avoid constraint violations, while producing these schedules rapidly (e.g., in near real-time).

Although certain goals and advantages are described, no single embodiment necessarily must include each and every such goal and advantage. Various implementations can be designed to achieve one, some, or all such goals and advantages and/or other goals or advantages.

It will be understood that although much of the description herein is in the context of scheduling satellites, one or more features of the present disclosure can also be implemented in other systems. For example, some embodiments of the systems and related methodologies disclosed herein can be used in satellite scheduling (e.g., imaging satellites or communication satellites), air traffic control, emergency vehicle routing and response systems, on-site repair scheduling, and the like.

Furthermore, it is to be understood that in finding an optimal or near-optimal solution to a scheduling problem, a cost or utilization function can be increased or maximized in certain implementations, or reduced or minimized in certain implementations, depending on a context in which the scheduling problem occurs. Finding a near-optimal solution to a scheduling problem can mean finding a solution that is sufficiently close to or including the optimal solution such that a difference between the solution and the optimal solution is less than a tolerance.

Terminology

Unless explicitly indicated otherwise, terms as used herein will be understood to imply their customary and ordinary meaning. For example, pair-wise constraint is a broad term and is to be given its ordinary and customary meaning to a person of ordinary skill in the art (e.g., it is not to be limited to a special or customized meaning), and includes, without limitation, constraints that prohibit an event based solely on properties of an immediately preceding event. For example, two image collection events are pair-wise constrained if there is insufficient time between the first image collection event and the second image collection event to change a pointing direction of an imaging satellite to perform the second image collection event.

Cumulative constraint is a broad term and is to be given its ordinary and customary meaning to a person of ordinary skill in the art (e.g., it is not to be limited to a special or customized meaning), and includes, without limitation, constraints that prohibit an event based on properties of preceding events. For example, an image collection event can be constrained if by performing the event the temperature of a camera acquiring the image would exceed acceptable temperature limits due at least in part to prior events.

In some implementations, a constellation of satellites can include any type of satellite including but not limited to satellites, mini-satellites, micro-satellites, nano-satellites, and so forth. Micro-satellite is a broad term and is to be given its ordinary and customary meaning to a person of ordinary skill in the art (e.g., it is not to be limited to a special or customized meaning), and includes, without limitation, satellites with a mass less than or equal to about 500 kg and/or physical dimensions less than or equal to about 125 cm×125 cm×175 cm, or satellites that launch as a secondary payload on a launch vehicle. According to some conventions, satellites having a mass less than or equal to about 500 kg are classified as small satellites with further divisions being made based on their mass. For example, in one classification system, small satellites are deemed mini-satellites when they have a mass between about 100 kg and 500 kg, micro-satellites when they have a mass between about 10 kg and 100 kg, nano-satellites when they have a mass between about 1 kg and 10 kg, pico-satellites when they have a mass between about 0.1 kg and 1 kg, and femto-satellites when they have a mass less than or equal to about 100 g. However, any reference to micro-satellite, mini-satellite, or small satellite in this disclosure should be understood to mean the general class of satellites having a mass less than or equal to about 500 kg and/or physical dimensions less than or equal to about 125 cm×125 cm×175 cm; and not to the more specific classification of satellites identified herein or other similar classification schemes.

Overhead image is a broad term and is to be given its ordinary and customary meaning to a person of ordinary skill the in the art (e.g., it is not to be limited to a special or customized meaning) and includes, without limitation, satellite images captured by satellites in earth-orbit, or other overhead images captured by aircraft (e.g., airplanes, helicopters, drones, unmanned aerial vehicles (UAV), balloons, etc.) surveying a geographic region, and the like. In some cases, the overhead image may be of an astronomical object rather than a terrestrial object.

Example Network of Imaging Satellites

FIG. 1 illustrates a representation of an example constellation 10 of imaging micro-satellites 12 in a low-earth orbit, a control system 14, a ground communication system 16, and an example of a target image area 18. Embodiments of the systems and methods described herein can be used to schedule events in the constellation 10 including, for example, determining which micro-satellite 12 is to acquire an image of the target image area 18, when the image is to be acquired, when the image is to be communicated to the ground communication system 16, and/or other scheduling events. The image can include a plurality of images, video, etc. In some implementations, the imaging micro-satellites 12 can include an image acquisition system configured to acquire multi-spectral and/or pan-spectral images or videos of the target image area 18. The imaging micro-satellites 12 can be owned and/or operated by a single entity or multiple entities. In various implementations, the constellation 10 may include 2, 4, 8, 10, 12, 16, 24, 30, or some other number of satellites. Although FIG. 1 shows an example constellation of micro-satellites 12, in other implementations the constellation 10 can include additional or different types of satellites including telecommunications satellites, mini-satellites, and so forth.

The control system 14 can include functionality that implements embodiments of the scheduling system disclosed herein so as to schedule events in the constellation. For example, the control system 14 can include embodiments of the control system 100 described with reference to FIGS. 2 and 3. The control system 14, 100 can include the scheduling module 104 described with reference to FIGS. 2-4 and 9. Scheduled events can include one or more tasks to be performed, data to be collected, information to be received or transmitted, duration, desired start time, desired end time, desired results, or any combination of these. For example, for an imaging satellite, events can be any task to be performed by the imaging satellite and can generally include, without limitation, imagery collection (e.g., of the target image area 18), imagery downlink (e.g., to the satellite ground communication station 16), and onboard maintenance.

Scheduling events for a constellation of satellites can be computationally difficult, particularly as the number of satellites in the constellation increases. Embodiments of the systems, methods, and algorithms described herein advantageously can be used to schedule events in such constellations efficiently and in real-time or near real-time. For example, the control system 14 can utilize any method described herein for producing optimal or near-optimal schedules, such as the example methods 500 and 700 described herein with reference to FIGS. 5 and 7. In addition, the control system 14 can implement optimal satellite scheduling with human collaboration using directed acyclic graphs according to example aspects of the present disclosure as described with reference to FIGS. X to X.

Example Scheduling Engine Systems and Methodologies

Creating a schedule of events or tasks for an object in a system can be a difficult and computationally intensive problem. One reason is that an object in a system can be subject to various constraints that limit the order and/or number of tasks that can be accomplished. Constraints can be pair-wise constraints, meaning that an event is constrained based solely on properties of an immediately preceding event, or cumulative constraints, meaning that an event is constrained based at least in part on a history of prior events. For example, a slew rate of an imaging satellite (e.g., a micro-satellite 12 in FIG. 1) can be considered a pair-wise constraint because whether an image can be acquired depends at least in part on whether the imaging satellite can change orientation from a previous task in time to acquire an image of a targeted area. The imaging satellite can also be subject to cumulative constraints, such as, for example, duplication constraints, temperature considerations, energy requirements, or data storage. As another example, a pair-wise constraint for an emergency response vehicle can be a combination of a distance between tasks and a typical duration of a task. The emergency response vehicle can also be constrained by cumulative constraints, such as a quantity of an expendable resource that the vehicle is capable of transporting.

Furthermore, systems can include multiple objects to be scheduled, increasing the complexity of the problem. The complexity can increase where a schedule of events for a first object affects a schedule of events for a second object. For example, if a first imaging satellite in a constellation of imaging satellites is schedule to acquire an image of a targeted area, a duplication constraint can dictate that a second imaging satellite not acquire an image of the targeted area to avoid duplicative image acquisitions which may be undesirable. As another example, air traffic control systems can schedule a landing and approach for a first aircraft which affects a landing and approach of a second aircraft.

In some circumstances, it can be desirable to create a schedule of events relatively quickly to be able to respond effectively to dynamic situations. Dynamic situations can be those where new events or tasks are being requested or constraints are being updated such that it is desirable to alter a previous schedule on a time scale sufficient to incorporate the new events or constraints without significantly disrupting the objects' performance. To achieve the desired agility with respect to creating updated schedules, some embodiments provide for a control and scheduling system that can be configured to create a schedule of events that is near-optimal (or optimal) in maximizing utilization (or minimizing a cost function) of objects in a system and communicate the schedule of events to the objects. In some embodiments, the control and scheduling system can create a schedule of events in near-real time. In some embodiments, the control and scheduling system can create a schedule of events on a time scale that is less than or equal to a typical length of time between consecutive events.

In some embodiments, a control and scheduling system is provided that can be configured to create a global schedule of tasks for a system of objects wherein the global schedule does not violate pair-wise, cumulative, or duplication constraints. In some embodiments, the control and scheduling system can use directed acyclic graphs to find a desired path through a sequence of events that satisfies the constraints of the system. By using directed acyclic graphs, the scheduling problem can become solvable in polynomial-time, thereby providing an advantage in computation time over other methods of solving scheduling problems of this type which are generally NP-hard. Moreover, the control and scheduling system can take advantage of parallelization to solve multiple graphs or aspects of the same graph at the same time, thereby increasing the speed or reducing the time to produce schedules. In some embodiments, the control and scheduling system exhibits a sub-linear scaling relationship between a number of objects in the system and computing power or time used to create schedules for the objects. As a result, some implementations of the control and scheduling system can produce a schedule of events in near real-time or on a time scale that is less than or comparable to an average length of time between events. Producing a schedule of events in near real-time can include producing the schedule in less than about 20 minutes, in less than about 15 minutes, in less than about 10 minutes, in less than about 5 minutes, or in less than about 1 minute.

Figure 2:
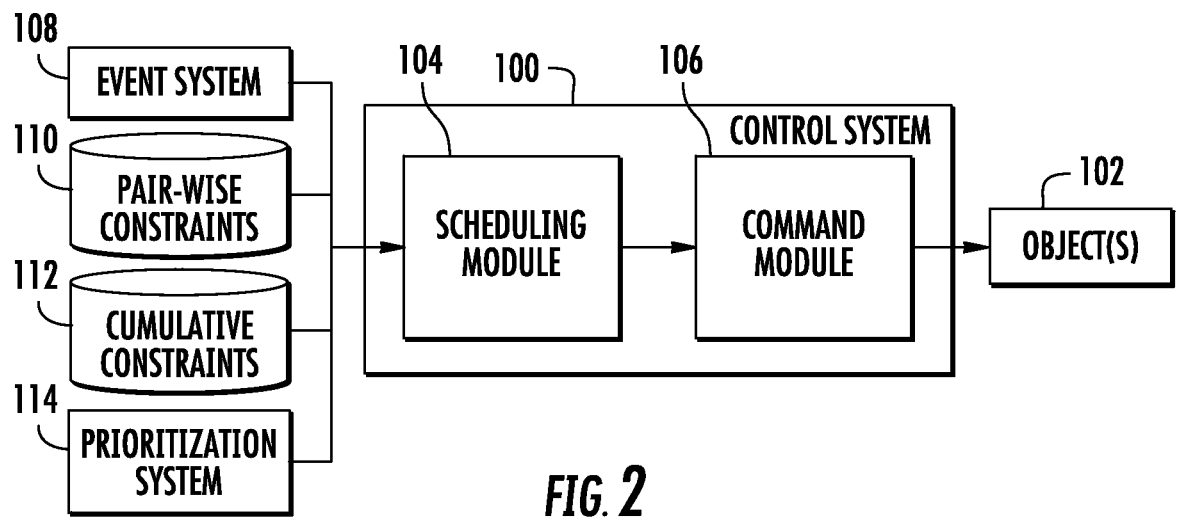
FIG. 2 illustrates a block diagram of an example embodiment of a control system configured to control one or more objects.

FIG. 2 shows a block diagram of an example embodiment of a control system 100 configured to control one or more objects 102. The control system 100 can control the objects 102 by analyzing information (e.g., events to be performed, priorities of events, event or object constraints, etc.), creating an efficient schedule of events based at least in part on the analyzed information, and commanding the objects to perform the scheduled events. The control system 100 includes a scheduling module 104 configured to receive information about events, priorities, and constraints and to produce a schedule of events. The control system 100 includes a command module 106 configured to receive the schedule of events from the scheduling module 104 and convert it into commands. The command module 106 can be configured to communicate those commands to the objects 102 or to another system that can communicate the commands to the objects 102. The control system 100 can be configured to produce a schedule and command the objects 102 to accomplish the events on the schedule in a relatively efficient manner while satisfying defined constraints. The control system 100 can be configured to update the schedule relatively rapidly to, for example, dynamically incorporate new tasks, modify existing tasks, remove tasks, add constraints, modify constraints, remove constraints, modify priorities, or any combination of these.

The control system 100 includes a scheduling module 104 configured to produce an efficient or near-optimized schedule of events. A schedule of events can include, for example, a list of events, tasks, activities, or routines for one or more objects and corresponding start times of each event. The scheduling module 104 receives events from an event system 108, pair-wise constraints from a pair-wise constraint database 110, cumulative constraints from a cumulative constraint database 112, and/or priority information from a prioritization system 114. The scheduling module 104 can produce a schedule of events that it sends to the command module 106. The schedule of events can be for a particular object 102 or it can be a global schedule with events to be performed by one or more objects 102. Thus, the scheduling module 104 can produce a globally optimal or near-optimal schedule for a plurality of objects 102, such as satellites in a constellation of satellites.

In some embodiments, the scheduling module 104 can receive one or more events from the event system 108 and create a schedule that increases or maximizes a utilization function based at least in part on the one or more events. The utilization function can incorporate information about the events and the objects 102 such that increasing or maximizing the function results in a schedule that efficiently or near-optimally accomplishes the defined events. For example, the scheduling module 104 can receive or retrieve prioritization information related to events received from the event system 108 and construct a schedule that increases or maximizes the utilization function based at least in part on the prioritization information. As another example, the scheduling module 104 can receive or retrieve constraint information from the pair-wise constraint database 110 or cumulative constraint database 112 and construct a schedule of events that satisfies the constraints while increasing or maximizing the utilization function.

As described more fully herein, certain embodiments of the scheduling module 104 can create efficient or optimal schedules dynamically through the use of directed acyclic graphs. For example, by using directed acyclic graphs, the scheduling module 104 can find an optimal or near optimal schedule while incorporating information about utilization functions, constraints, and prioritization. This graph-based approach to scheduling can result in a relatively fast algorithm that can produce near-optimal schedules for relatively large and complex systems of objects. The graph-based approach can respond dynamically to modifications, additions, or deletions of input parameters in a relatively quick manner compared to typical non-graph-based approaches. For example, the scheduling module 104 can be configured to incorporate changes in tasks, events, constraints, priorities, utilization function, or any combination of these and create a new schedule relatively quickly. In some embodiments, the scheduling module 104 can produce a near-optimal schedule using a directed graph-based approach about an order of magnitude faster than if it were to employ non-graph-based techniques.

The control system 100 includes a command module 106 configured to convert the schedule produced by the scheduling module 104 into commands to send the objects 102.

The command module 106 can include a module configured to receive schedule information. The module can convert the information in the schedule to a set of commands to be delivered to one or more objects 102. In some embodiments, the command module 106 includes a communication module configured to communicate the set of commands to the one or more objects 102. For example, the command module 106 can include an array of antennas configured to transmit control instructions based at least in part on a received schedule to one or more satellites. The satellites can receive the transmitted instructions and perform the requested tasks at designated times. The command module 106 can dynamically update the control instructions based at least in part on updated scheduling information received from the scheduling module 104.

The objects 102 can be one or more satellites, vehicles, machines, people, group of people, or some combination of people and machines capable of being controlled. In some embodiments, the objects 102 comprise satellites configured to respond to control instructions received from a control system 100. For example, in response to control instructions received from the control system 100, a satellite can adjust its attitude, transfer stored data to a ground station at a designated time based, operate an onboard system in a defined manner based, perform a maintenance routine, acquire an image with an imaging system, or any combination of these or the like. In some embodiments, the objects 102 are aircraft such as airplanes or helicopters, emergency vehicles, repair teams, or the like.

The control system 100 can receive information from the event system 108. The event system 108 can be a system that creates, collects, receives, generates, and/or organizes events to be performed by the objects 102. An event can be a collection of instructions and/or information as defined by the event system 108, and can include, for example, one or more tasks to be performed, data to be collected, information to be received or transmitted, duration, desired start time, desired end time, desired results, or any combination of these. For example, for an imaging satellite, events can be any task to be performed by an imaging satellite and can generally include, without limitation, imagery collection, imagery downlink, and onboard maintenance. Imagery can include still images and/or video. The event system 108 can collect event requests from other systems. For example, the event system 108 can include a user interface and receive requests from a user. The event system 108 can interface with other systems that aggregate event requests for the objects 102. The event system 108 can receive or produce event requests based at least in part on a set schedule of events, such as routine scheduled maintenance. The event system 108 can produce event requests based at least in part on satisfaction of defined criteria, such as transmitting information when in range of a receiving station. The event system 108 can transmit an event or list of events to the scheduling module 104 at regular intervals, upon request from the control system 100, upon receiving or producing a new event request, or any combination of these. As described more fully herein with reference to FIGS. 5 and 6, events can be used to define nodes in a graph-based approach to finding a desirable schedule.

The control system 100 can be configured to retrieve or receive pair-wise constraints from the pair-wise constraint database 110. Pair-wise constraints can be a property of the objects 102 that place functional limits on the objects' 102 ability to perform consecutive events. A pair-wise constraint can mean that whether the object 102 is capable of performing an event is determined based at least in part on properties of an immediately preceding event. For example, consecutive image collection events in an imaging satellite can be constrained by a satellite's agility. Agility refers to an ability of a satellite to slew from one pointing angle to another pointing angle within a defined period of time. For example, if a first collection has a first end time and a first pointing angle and a second collection has a second start time and a second pointing angle, then a pair-wise constraint would be violated if a maximum slew rate of the satellite would not be sufficient to transition the satellite from the first pointing angle to the second pointing angle in the time between the first end time and the second start time. As described more fully herein with reference to FIG. 5, pair-wise constraints can be used to create connections between nodes in a graph-based approach to finding a desirable schedule.

The control system 100 can be configured to retrieve or receive cumulative constraints from the cumulative constraint database 112. Cumulative constraints can be a property of the objects 102 that place functional limits on the objects' 102 ability to perform an event. A cumulative constraint can mean that whether the object 102 is capable of performing an event is determined based at least in part on a history of prior events. For example, an image collection event in an imaging satellite can be constrained by data capacity limitations, power requirements, and/or thermal considerations. As described more fully herein with reference to FIG. 5, cumulative constraints can be used during a computation of a path through a collection of graphs in a graph-based approach to finding a desirable schedule.

Data capacity limitations can refer to limits on the imaging satellite in terms of storing bits of data and transmitting the bits of data to a receiving station. Data capacity limitations can refer to an amount of onboard storage on the imaging satellite. Data capacity limitations can refer to an operational constraint that forces the imaging satellite to transmit all stored data to a receiving station during a data transmission event. Data capacity limitations are cumulative constraints because a history of prior events determines whether a data capacity limitation would be violated. For example, if onboard storage is nearing maximum capacity, attempting to store an additional image acquisition could require more data storage than is available. The additional image acquisition event would therefore violate the cumulative constraint.

Power requirements can refer to an ability of the imaging satellite to keep its subsystems provided with enough power to function. The imaging satellite can have various source of power such as solar panels and/or batteries. Different operational and/or situational states of the imaging satellite can be power-positive, such as when the imaging satellite is exposed to sunlight and not acquiring imagery, or power-negative, such as during image acquisition. An energy budget of the imaging satellite can be managed through the use of a power requirement cumulative constraint to ensure that there is sufficient power on the imaging satellite to perform desired or critical tasks.

Thermal considerations can refer to an ability of the imaging satellite to safely keep a temperature of its components within safe-operating margins. For example, components of the imaging satellite can include the camera, the payload electrical subsystem, and the payload radio subsystem. The temperature of components can vary depending on operational and situational states, such as whether the system is on or whether the satellite is exposed to the sun. Whether a particular event will result in an unacceptable temperature on a component depends at least in part on a history of the component. For example, whether an imaging event will cause the camera's temperature limit to be violated depends at least in part on the state of the camera in the time preceding the event.

The control system 100 can receive priority information from the prioritization system 114. The prioritization system 114 can be a system that assigns weights or priorities to events. The priorities can be configured to assign a relative weight to events such that events with high priorities are preferable to events with low priorities. The prioritization system 114 can transmit the priorities to the control system 100 for use in the scheduling module 104. The prioritization system 114 can assign priorities to events according to user input, internal algorithms, external factors, or any combination of these. In some embodiments, the prioritization system 114 can assign a relatively large priority to events that are critical, effectively forcing the scheduling module 104 to include the critical events in any schedule it produces. The prioritization system 114 can assign priorities based at least in part on a variety of factors such as customer demands, price, timeliness of an event, and other factors. As described more fully herein with reference to FIG. 5, priorities can be used to weight edges between nodes for use in computing a path through a collection of graphs in a graph-based approach to finding a desirable schedule.

In some embodiments, the scheduling module 104 and the command module 106 are components in a unitary control system 100. In some embodiments, the scheduling module 104 and the command module 106 are physically distinct systems configured to communicate with one another through a network, direct wired connection, direct wireless connection, or through another means. The event system 108, the pair-wise constraints database 110, the cumulative constraints database 112, and the prioritization system 114 can be components of a unitary system, part of the control system 100, physically distinct systems, or any combination of these.

Figure 3:
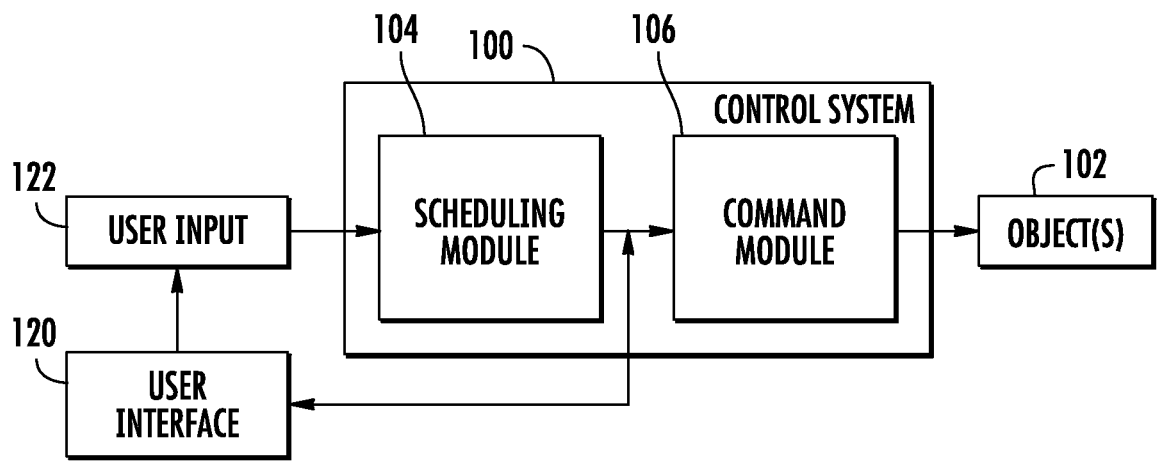
FIG. 3 illustrates a block diagram of an example embodiment of a control system incorporating a user interface.

FIG. 3 illustrates a block diagram of an example embodiment of a control system 100 incorporating a user interface 120. The control system 100 receives input from user input 122 and outputs information about a proposed schedule to the user interface 120. Through user input 122, a user can transmit information concerning events, constraints, and/or priorities to the control system 100. The user input 122 can be received from a user via a computing device such as a server, a desktop computer, a laptop, a tablet, a smartphone, a personal digital assistant (PDA), and the like. The user can view results of a scheduling process through the user interface 120 (e.g., a user interface on the computing device). In some embodiments, the user can view the results of the scheduling process on the user interface 120 and, through the user input 122, provide additional feedback to the control system 100 to achieve a new result. In some embodiments, the command module 106 will wait for user input or approval through user input 122 before proceeding with sending control instructions to object(s) 102.

The user interface 120 can include a display that allows the user to view scheduling information produced by the scheduling module 104. The user interface 120 can include elements that allow the user to interact with the information, simulate changes in schedules according to proposed changes to input parameters, view detailed results about a proposed schedule and/or alternate schedules, and the like. The user interface 120 can be provided on a server, desktop computer, tablet, smartphone, PDA, or the like.

The user input 122 can provide the user an ability to transmit information to the scheduling module 104. The user input 122 can be part of the same system as the user interface 120, the scheduling module 104, the command module 106, the control system 100, or any combination of these. The user input 122 can include physical elements that allow the user to send information to the scheduling module such as, for example, a keyboard, touch screen interface, microphone, camera, joystick, buttons, switches, or other similar user input elements or combination of elements. In some embodiments, the user interface 120 and the user input 122 are a unitary system such as a computer, tablet, smartphone, PDA, or the like. In this way, the user can connect to the control system 100 to provide input and guidance regarding controlling objects 102. In some embodiments, the user interface 120 and/or the user input 122 can communicate with each other and/or with the control system 100 via a network. The network can include a wired, wireless, terrestrial, and/or satellite network, which can include a local area network (LAN), a wide area network (WAN), the Internet, and so forth.

In some embodiments, the control system 100 receives information about events, constraints, and/or priorities from external systems or databases in addition to receiving information through user input 122. The control system 100 can function without input from the user, but the user can input information to alter or change the results of the scheduling module 104.

Scheduling Module

Figure 4:
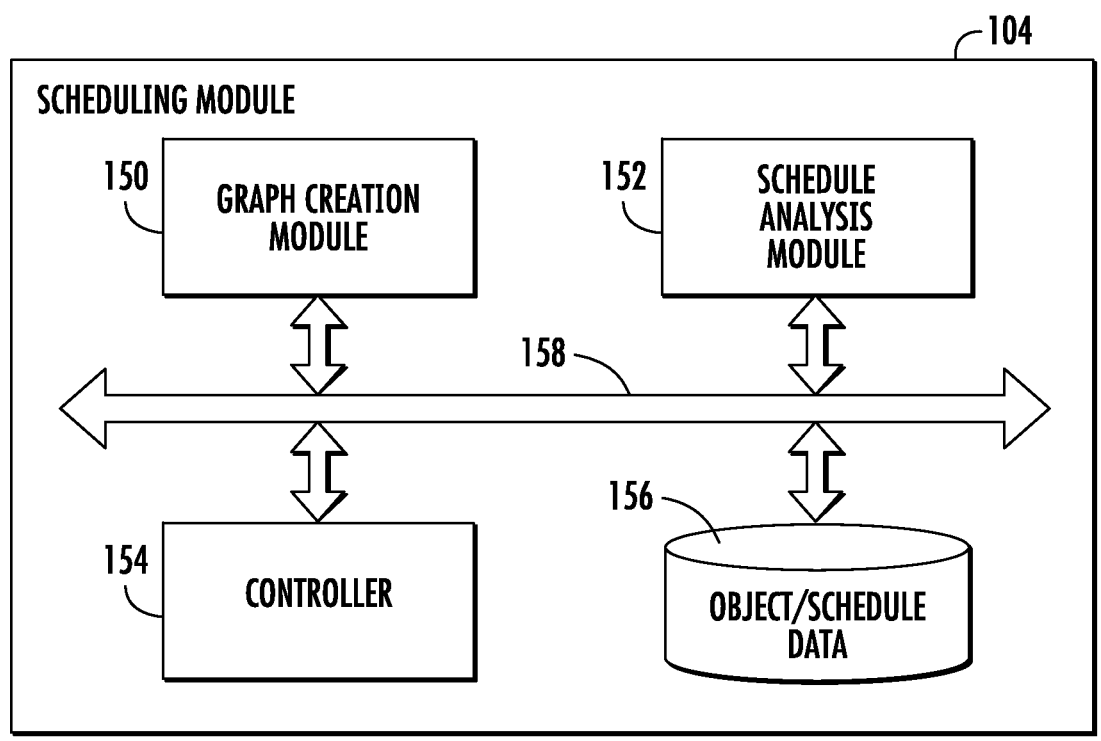
FIG. 4 illustrates a block diagram of an example embodiment of a scheduling module.

FIG. 4 illustrates a block diagram of a scheduling module 104 according to some embodiments. The scheduling module 104 can include hardware, software, and/or firmware components used to produce schedules for the control system 100. The scheduling module 104 can be configured to receive information from various systems, create one or more graphs based at least in part on the received information, determine a desirable path through the created graphs, and communicate the desirable path to one or more systems such as the command system 106. The scheduling module 104 can include a graph module 150, a schedule analysis module 152, a controller 154, and object/schedule data storage 156. Components of the scheduling module 104 can communicate with one another, with external systems, and with other components of the control system 100 over communication bus 158. The scheduling module 104 can employ any method described herein for producing optimal or near-optimal schedules, such as the example methods 500 and 700 described herein with reference to FIGS. 5 and 7. In addition, the control system 14 can implement optimal satellite scheduling with human collaboration using directed acyclic graphs according to example aspects of the present disclosure as described with reference to FIGS. X to X.

Figure 6:
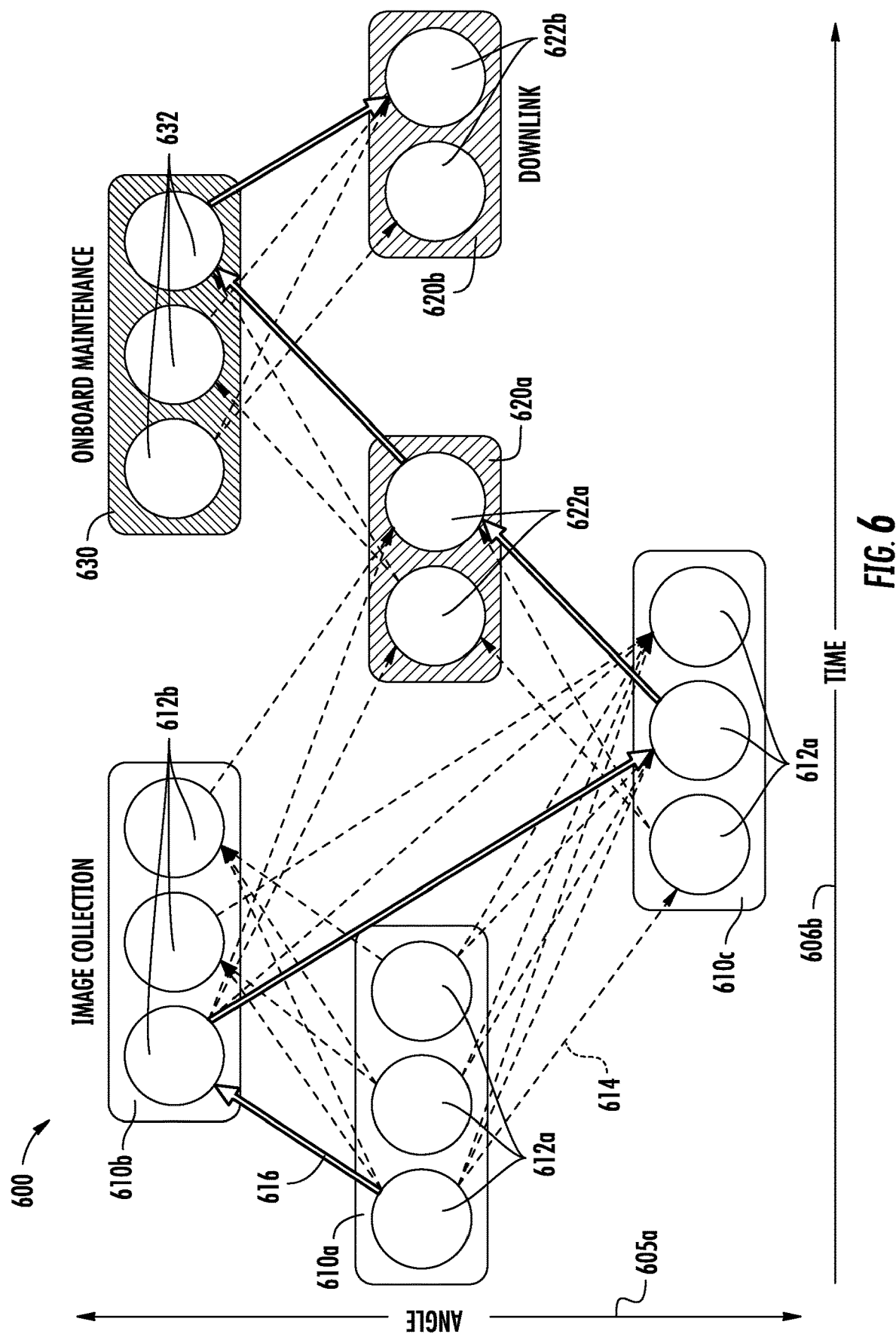
FIG. 6 illustrates an example graph showing possible paths through the graph and an example of a near-optimal path.

The scheduling module 104 includes a graph module 150. The graph module 150 can be configured to create directed acyclic graphs based at least in part on events and pair-wise constraints. Directed acyclic graphs can include nodes which represent events and directed edges which connect nodes and represent allowable sequences of events. FIG. 6 for an example directed acyclic graph 600. The graph module 150 of FIG. 4 can receive a list of events from which a schedule of events will be made. For each event, the graph module 150 can create one or more nodes representing discretized start times and/or duration for the event. Once nodes for more than one event are created, the graph module 150 can create edges between nodes in different events. The graph module 150 can start with a first node in a first event and attempt to create a directed edge pointing from the first node to a node in a different event. The graph module 150 will create the directed edge if connecting the two nodes does not violate any pair-wise constraints. The graph module 150 can effectively force a critical event, if desired, to be included in a schedule by creating a graph where all acceptable paths through the graph pass through the critical event. A critical event is optional and for certain schedules no critical events are used. For schedules in which a critical event is desired, in order to force the critical event, the graph module 150 may create a graph that is different from a graph that would have been constructed otherwise, removing edges that do not violate pair-wise constraints but that would have resulted in bypassing the critical event. For example, in FIG. 6 some paths through the graph bypass image collection event 610c. To make image collection event 610c a critical event, the graph module 150 would remove the edges that directly connect nodes in image collection event 610b to nodes in downlink event 620a. In making an event a critical event, the graph module 150 can also remove some nodes because any path through those nodes would result in the critical event being missed.

The scheduling module 104 includes a schedule analysis module 152. The schedule analysis module 152 analyzes paths through graphs produced by the graph module 150. For each graph, the schedule analysis module 152 attempts to find a path through the graph that maximizes or minimizes a utilization or cost function. As described more fully with reference to FIG. 5, the schedule analysis module 152 can check for constraint violation while maximizing the utilization function. In contrast to systems that maximize the utilization function first and check for violation of cumulative constraints after, the schedule analysis module 152 can identify nodes in a path which would violate cumulative constraints if included during the procedure to find an optimal schedule. The schedule analysis module 152 can remove the node at the moment it finds that its inclusion would violate a cumulative constraint. Once removed, the schedule analysis module 152 can proceed in the optimization procedure. In this way, the schedule analysis module 152 finds a path through the graph that does not violate any constraints and that is near-optimal. Near-optimal in this case can include a path identified that may not be the path that truly maximizes utilization, but that it is sufficiently close to the optimal path that it is satisfactory. Near-optimal can also include the path that truly maximized utilization.

Typically, an optimal path through a graph would be a path that maximizes the utilization function without violating any cumulative constraints, which may require many iterations through the graph to determine which path through the graph results in this maximum utilization. The schedule analysis module 152 can find a path that approaches or achieves maximum utilization with the same or fewer iterations, because it identifies paths that violate cumulative constraints at the point of constraint violation. When this happens, the schedule analysis module can remove the offending portion of the path and proceeds with the optimization procedure. It may be the case that removing the identified portion of the path does not result in a truly maximized utilization (e.g., removing a different portion of the path would result in a higher utilization), but by removing the offending portion of the path at the point of constraint violation allows the schedule analysis module 152 to arrive at an optimal or near-optimal path through the graph with relatively fewer iterations, and thus with greater speed and/or efficiency. Furthermore, the schedule analysis module 152 limits removal of an edge or node at a point in the graph before constraint violation rather than attempting to remove edges or nodes throughout the graph to achieve an optimized path. Thus, the schedule analysis module 152 can efficiently construct a near-optimal path through the graph that does not violate any constraints.

The scheduling module 104 includes a controller 154. The controller 154 can include one or more hardware processors and can be used by any of the other components, such as the graph module 150 or the schedule analysis module 152, to process information. As used herein, the term "processor" refers broadly to any suitable device, logical block, module, circuit, or combination of elements for executing instructions. The controller 154 can be any conventional general purpose single- or multi-chip microprocessor. In addition, the controller 154 can be any special purpose microprocessor such as a digital signal processor. The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA), or other programmable logic device, discrete gate or transistor logic, discrete hardware components, circuitry, or any combination thereof designed to perform the functions described herein. A general purpose processor, such as controller 154, can be a conventional microprocessor, but the controller 154 can also be any conventional processor, controller, microcontroller, or state machine. Controller 154 can also be implemented as a combination of computing devices, e.g., a combination of a DSP and a microprocessor, a plurality of microprocessors, one or more microprocessors in conjunction with a DSP core, or any other such configuration.

The scheduling module 104 includes object/schedule data storage 156. Data storage 156 can be coupled to the other components of the scheduling module 104, such as the controller 154, the graph module 150, and the schedule analysis module 152. Data storage 156 can refer to non-transitory electronic circuitry that allows information, typically computer data, to be stored and retrieved. Data storage 156 can refer to external devices or systems, for example, disk drives, optical drives, or solid state drives. Data storage 156 can also refer to fast semiconductor storage (chips), for example, Random Access Memory (RAM) or various forms of Read Only Memory (ROM), which are directly connected to the one or more processors of the scheduling module 104. Other types of memory include bubble memory and core memory.

Example Method for Finding Near-Optimal Schedules

The scheduling module 104 can use various methods utilizing directed graphs for finding an optimal or near-optimal schedule of events. The scheduling problem as generally described can belong to a class of problems that are NP-hard, due at least in part to the fact that it is an optimization problem mixing continuous variables (e.g., start time of an event) and discrete variables (e.g., choosing which events to perform). One result of graph theory is that finding a longest or shortest path through a set of directed acyclic graphs is generally solvable in polynomial time.

As generally constructed, the scheduling problem attempts to find a sequence of events that maximizes (or minimizes) a utilization (or cost) function. For example, a cost function can incorporate a binary indicator, $c_i$, for whether an event, i, is selected; a time of completion for an event, $t_i$; and a priority or weight for the event, $w_i$. Expressed mathematically, the problem is to find a maximum of the sum of the product of the binary indicator and the priority, $c_i w_i$, where the event, i, has a start time, $t_i$, that is after an earliest acceptable start time, $st_i$, and before a latest acceptable start time, $et_i$:

$$\max \sum_{i=0}^{N} c_i w_i$$

where $c_i \in 0, 1$ and $st_i \leq t_i \leq eti$

To incorporate constraints, additional criteria are used. For example, a pair-wise constraint can be included, $pw_{con}(t_i+1, t_i)$, and a cumulative constraint can be included, Xi:

$$\max \sum_{i=0}^{N} c_i w_i$$

s.t. ($\forall$ i):

$c_i \in 0, 1$ $t_i > st_i$ $t_i < et_i$ $t_{i+1} - (t_i + \tau_i) \geq c_{i+1} \times c_i \times pw_{con}(t_{i+1}, t_i)$ $X_i < X_{max}$ The pair-wise constraint can depend on a time between an end of a first event, $t_{i+\tau i}$, and a beginning of a second event, $t_{i+1}$, where $\tau_i$ is a duration of event i. For an imaging satellite, a pair-wise constraint can be an agility function which depends on pointing angles, θ, between events. Cumulative constraints for the imaging satellite can include a temperature of the camera, $T_{CAM}$, a temperature of an electrical system, $T_{ES}$, a temperature of a radio system, $T_{RS}$, data stored at the end of an event, d, and energy remaining after an event, e. The function to maximize, in this case, would then be:

$$\max \sum_{i=0}^{N} c_i w_i$$

s.t. ($\forall$ i):

$c_i \in 0, 1$ $t_i > st_i$ $t_i < et_i$ $t_{i+1} - (t_i + \tau_i) \geq c_{i+1} \times c_i \times \text{agility}(\theta_{i+1}(t_{i+1}), \theta_i(t_i))$ $T_{CAM_i} < T_{CAM_{max}}$ $T_{ES_i} < T_{ES_{max}}$ $T_{RS_i} < T_{RS_{max}}$ $d_i < d_{max}$ $e_i < e_{max}$ In this example, the utilization function is a sum of the priority weights for the events which are actually selected. The output of the optimization will be the subset of events which will be performed (and their associated start times) which maximizes the utilization function while obeying the constraints of the system. As stated above, this optimization problem is difficult because it is a mix of discrete and continuous variables.

The cumulative constraints can be calculated over time. To do so, information at a previous stage can be used along with a function which describes how the cumulative constraint develops over time. The result is an equation which represents each variable associated with a cumulative constraint at a given point in time, examples of which are given in the below equations:

$T_{cam_{i+1}} = c_{i+1} \cdot \text{cam}_{ON}(t_{i+1}, \tau_{i+1}, T_{cam_i}, t_i + \tau_i) + (1 - c_{i+1}) \cdot \text{cam}_{OFF}(t_{i+1}, T_{cam_i}, t_i + \tau_i)$ $T_{pes_{i+1}} = c_{i+1} \cdot \text{pes}_{ON}(t_{i+1}, \tau_{i+1}, T_{pes_i}, t_i + \tau_i) + (1 - c_{i+1}) \cdot \text{pes}_{OFF}(t_{i+1}, T_{pes_i}, t_i + \tau_i)$ $T_{prs_{i+1}} = c_{i+1} \cdot \text{prs}_{ON}(t_{i+1}, \tau_{i+1}, T_{prs_i}, t_i + \tau_i) + (1 - c_{i+1}) \cdot \text{prs}_{OFF}(t_{i+1}, T_{prs_i}, t_i + \tau_i)$ $d_{i+1} = c_{i+1} \cdot \text{data}_{ON}(\tau_{i+1}, d_i)$ $e_{i+1} = c_{i+1} \cdot \text{energy}_{ON}(t_{i+1}, \tau_{i+1}, e_i, t_i + \tau_i) + (1 - c_{i+1}) \cdot \text{energy}_{OFF}(t_{i+1}, e_i, t_i + \tau_i)$ In the above equations, functions are used which represent effects on the variables when a particular system is on (e.g., $X_{ON}(\ldots)$) and off (e.g., $X_{OFF}(\ldots)$).

One approach to finding an optimal path is to use directed graphs. Using this approach, each event becomes a node in a graph with edges connecting nodes representing sequences of events that do not violate defined constraints. FIG. 6 depicts an example of a directed acyclic graph 600. The edges can be weighted to represent their cost, where a sum total of the cost can be maximized or minimized depending on the application. For example, for an imaging satellite application, the longest path or the maximum cost or utility can represent the most desirable list of events that can be accomplished within a given time frame. A path through the directed graph represents an acceptable schedule of events. Algorithms for finding a shortest path through a graph include, for example, Dijkstra's algorithm, described in E. W. Dijkstra, "A Note on Two Problems in Connexion with Graphs," Numerische Mathematik, Vol. 1, No. 1, pages 269-271 (1959). Other algorithms for finding a shortest or longest path through a graph can be used in other embodiments, such as, e.g., the Bellman-Ford algorithm, the Floyd-Warshall algorithm, or Johnson's algorithm.

Figure 5:
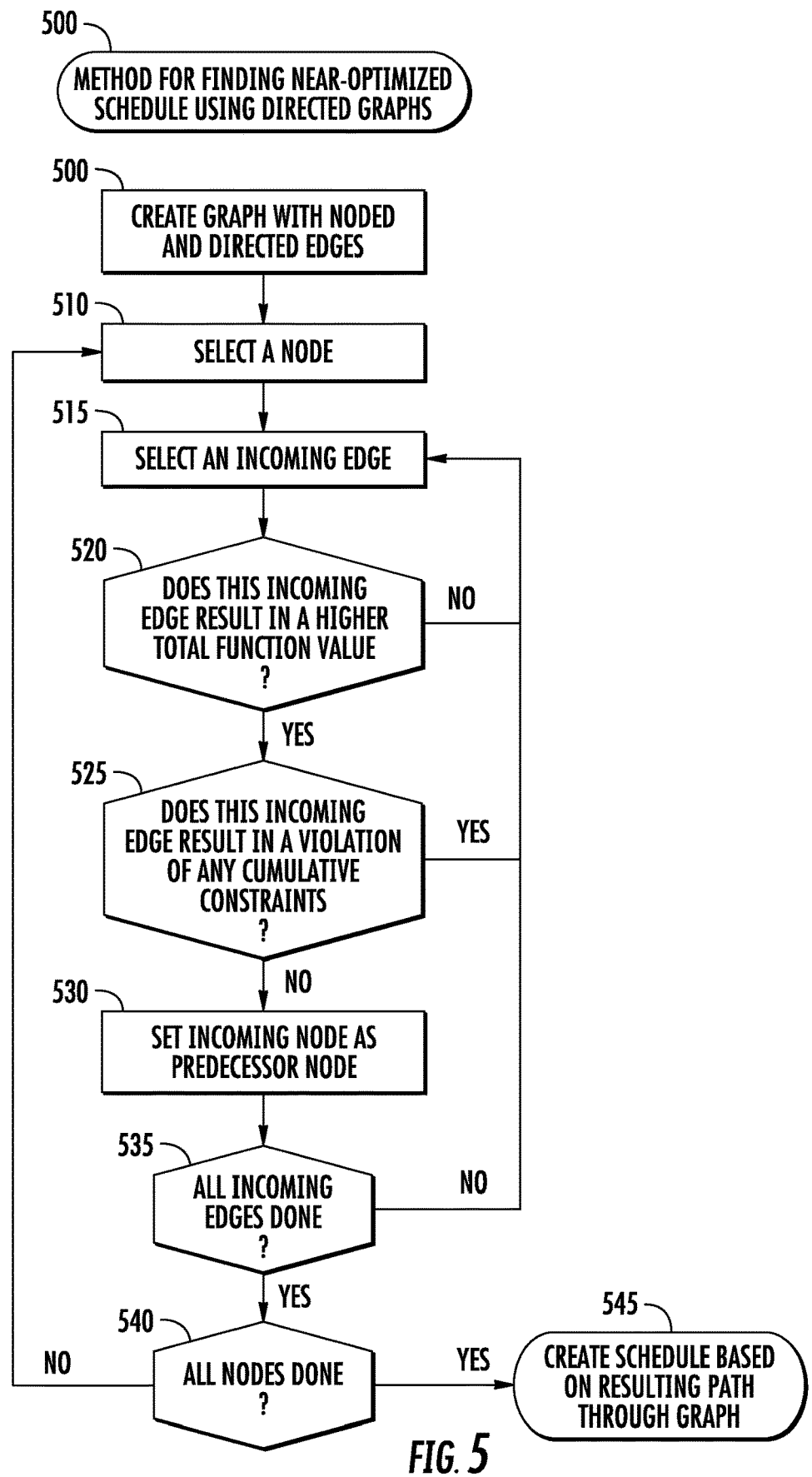
FIG. 5 illustrates a flow chart of an embodiment of a method for finding a near-optimal schedule using a graph.

FIG. 5 illustrates a flow chart of an example method 500 for finding a near-optimal schedule using directed graphs. For ease of description, the blocks in the method 500 will be described as being performed by the scheduling module 104. Blocks in the method 500, however, can be performed by various systems or modules or combination thereof. In addition, throughout the description reference will be made to an example directed acyclic graph 600 as illustrated in FIG. 6.

In block 505, the scheduling module 104 creates a graph having nodes and edges connecting nodes. For example, the scheduling module 104 can create the graph 600 having events 610a, 610b, 610c, 620a, 620b, and 630 where each event has one or more nodes corresponding to reference numbers 612a, 612b, 612c, 622a, 622b, and 632. Edges 614 connect nodes where an edge connecting two nodes is drawn if performing both nodes in sequence does not violate pair-wise constraints. Because no edges are included in the graph which would violate pair-wise constraints, any path through the graph is not pair-wise constrained. At this point, the scheduling module 104 can incorporate critical event information. A critical event can be an event that is required or highly desirable. A particular graph may or may not include one or more critical events. The scheduling module 104 can alter the graph such that the critical event or events are not bypassed in any way, or that all paths through the graph include nodes in the critical event or events. For example, in FIG. 6 event 610c can be made critical by removing edges 614 that connect nodes 612b in image collection event 610b to nodes 622a in downlink event 620a. The scheduling module 104 can receive information about events, constraints, priorities, critical events, and the like from sources such as, for example, a user or users, remote modules or systems, local modules or systems, data storage, or the like.

In block 510, the scheduling module 104 selects a node. There can be a starting node and a corresponding ending node, with all other nodes falling between the starting node and ending node. The scheduling module 104 can iterate through the nodes in the graph one at a time to find an optimal or near-optimal path. In block 515, the scheduling module 104 selects an incoming edge for the selected node. The incoming edge is an edge that originates in a preceding node and terminates at the selected node. The scheduling module 104 can iterate through incoming edges at the selected node to determine the edge that has the highest incoming value that does not violate cumulative constraints.

In block 520, the scheduling module 104 checks the value of the selected incoming edge to determine whether it results in a higher total value of the utilization function. The value of the selected incoming edge can correspond to a weight or priority value assigned to the edge. The value of the selected incoming edge can correspond to a value of the utilization function of an incoming path. Thus, the scheduling module 104 can select the incoming edge which would result in the highest utilization value. Where the value of the selected incoming edge corresponds to a value of an incoming path, not just an individual incoming edge, the scheduling module 104 can select the incoming path that results in the highest utilization value.

In block 525, the scheduling module 104 checks whether including the selected incoming edge in the path would violate any cumulative constraint. The selected incoming edge can include information about a corresponding incoming path. The scheduling module 104 can calculate a value of one or more parameters related to cumulative constraints to check whether inclusion of the preceding path would result in a violation of the constraints. If a constraint is violated, the incoming path is not included in the final path. In this way, the scheduling module 104 can construct a path that does not violate any constraints and that is optimal or near optimal. It may be near optimal where a preceding edge other than the incoming edge is a primary contributor to a violation in the cumulative constraint. In that case, removal of the primary contributor may result in a path with a higher utilization. For example, if the scheduling module 104 determines that including the incoming edge would violate a cumulative constraint, it may be that removing a predecessor edge included in the incoming path would result in an incoming path that does not violate cumulative constraints but that would result in a higher utilization value. However, to discover the optimal predecessor edge to remove can require more time and/or computational power than is desirable. Thus, utilizing the method 500, the scheduling module 104 can determine, in a relatively quick and/or efficient manner, a path that is sufficiently close to the optimal path to be satisfactory for an intended purpose. For example, in a constellation of imaging satellites, it may be desirable or more valuable to be able to quickly update schedules to respond to changing needs and/or customer requests rather than finding the maximum utilization of the constellation.

If the selected incoming edge results in a higher total value of the utilization function and does not violate any cumulative constraints, the scheduling module 104 includes the originating node as the predecessor node for the currently selected node in block 530.

In block 535, the scheduling module 104 checks whether all the incoming edges have been checked. If there are remaining incoming edges, the scheduling module 104 returns to block 515. If all incoming edges have been checked, the scheduling module 104 checks whether all nodes in the graph have been analyzed in block 540. If there are additional nodes, the scheduling module 104 returns to block 510 to select a different node. If all nodes have been analyzed, the scheduling module 104 concludes the method by producing the optimized or near-optimized schedule by backtracking via the selected predecessor nodes in block 545. In FIG. 6, the optimized or near-optimized schedule corresponds to the bolded arrows 616 through the graph 600.

In some implementations, the algorithm in blocks 515 through 540 can be represented as follows:

for i∈in-edges$_j$ do
  if dist$_i$+w$_{ij}$>dist$_j$ then
    dist$_j$←dist$_i$+w$_{ij}$
    prev$_j$←i
  end if
end for In the construction, optimization is achieved by looping through nodes and for each node, j, choosing the longest incoming cumulative path, dist$_j$. The set in-edge$_j$ is all the nodes that have edges originating in a different node and terminating in node j. This set is the closed set of nodes from which a predecessor node (prev$_j$) will be chosen for node j. The weights, w$_{ij}$, represent the priority or weighted value of the edge connecting nodes i and j.

To incorporate cumulative constraints, the above example algorithm can be modified to include steps to check for constraint violation:

for i∈in-edges$_j$ do
  if dist$_i$+w$_{ij}$>dist$_j$ then
    if CUMUL$_1$(t$_j$,τ$_j$,X$_i$,t$_i$+τ$_i$))<X$_{max}$ then
      X$_j$←CUMUL$_1$(t$_j$,τ$_j$,X$_i$,t$_i$+τ$_i$))
      dist$_j$←dist$_i$+w$_{ij}$
      prev$_j$←i
    end if
  end if
end for where CUMUL$_I$ represents a function that calculates a value for a parameter, X, where the parameter corresponds to a cumulative constraint. The function can calculate a value of the parameter assuming the two events in question are performed. The function can incorporate information about prior events such that the function represents the value of the parameter for a particular incoming path. Thus, the scheduling module 104 can identify edges that result in violations of cumulative constraints at the time the constraint is violated. The scheduling module 104 can remove that edge from the path and continue through the method 500 to find the optimal path that does not include the edge which violates the cumulative constraint.

Constraints can be added, removed, or modified using this and similar formulations, allowing for schedules to be updated dynamically according to changing circumstances. For example, an additional constraint can be added to the system. The additional constraint would result in adding an additional "if" statement in the above algorithm with an appropriate equation and/or comparison. Similarly, a constraint can be removed by removing the corresponding "if" statement. Similarly, a constraint can be modified by modifying the corresponding constraint value (e.g., $X_{max}$) or constraint function (e.g., $CUMUL_I$). Examples of additional constraint functions are provided below:

$$cam_{ON}(t_j, \tau_j, T_{cam_j}, t_i + \tau_i) > T_{cam_{max}}$$

$$pes_{ON}(t_j, \tau_j, T_{pes_j}, t_i + \tau_i)) > T_{pes_{max}}$$

$$data_{ON}(\tau_j, d_i)) < d_{max}$$

$$energy_{ON}(t_j, \tau_j, e_i, t_i + \tau_i)) < e_{max}$$

Additionally, where such constraint functions are utilized, corresponding changes to the constraint values should be incorporated into the function:

$$T_{cam_j \leftarrow cam}ON(t_j, \tau_j, T_{cam_j}, t_i + \tau_i)$$

$$T_{pes_j} \leftarrow pes_{ON}(t_j, \tau_j, T_{pes_j}, t_i + \tau_i)$$

$$d_j \leftarrow data_{ON}(\tau_j, d_i)$$

$$e_j \leftarrow energy_{ON}(t_j, \tau_j, e_i, t_i + \tau_i)$$

In some embodiments, the scheduling module 104 can utilize parallelization to solve multiple graphs (or aspects of the same graph) at the same time. For example, the node-centric algorithm embodied by the method 500 can be run for many different nodes at the same time where nodes are independent of preceding nodes (e.g., the nodes are not connected by an edge of combination of edges). Independent nodes can be optimized in parallel which effectively flattens the graph so that its total computational time can be on the order of the largest number of edges between the starting and ending nodes (which in general is less than or equal to the total number of nodes in the graph). In some embodiments, the scheduling module 104 exploits parallelization by optimizing different graphs representing different spans of time in parallel. In some embodiments, the scheduling module 104 can create multiple clones of graphs with differences between them to exploit parallelization and find a highest-valued path among the near-optimal paths produced, thereby allowing the scheduling module 104 to find or more closely approximate the optimal path through the graph. For example, the scheduling module 104 can clone graphs and remove edges suspected of causing a cumulative constraint to be violated. Suspect edges can be limited to those edges that occurred prior in time to the constraint violation. Due at least in part to the removal of suspect edges, the scheduling module 104 can identify a path through the graph that approaches the optimal path. Due at least in part to limiting the removal of edges to those that happened prior in time, the scheduling module 104 can relatively quickly determine a desirable path through the graph. Parallelization can be advantageous due at least in part to the availability of massively parallelizing computation using commodity hardware and software for distributed computing such as the APACHE™ HADOOP™ software library (available from The Apache Software Foundation).

As referenced above, FIG. 6 illustrates an example graph 600 showing possible paths 614 (dashed lines) through the graph and a near-optimal path 616 (heavy solid line). The graph 600 can represent events for a constellation of imaging satellites such as the example constellation 10 shown in FIG. 1. The graph includes image collection events 610a, 610b, and 610c; downlink events 620a and 620b; and an onboard maintenance event 630. For each event 610a, 610b, 610c, 620a, 620b, and 630, there are one or more nodes 612a, 612b, 612c, 622a, 622b, and 632. Edges 614 represent acceptable sequences of events where the sequence is not pair-wise constrained. For example, an edge 614 originating in a node 612a and terminating in node 612b indicates that performing the image collection event 610a corresponding to a particular node 612a followed by performing the image collection event 610b corresponding to a particular not 612b does not violate any pair-wise constraints such as an agility constraint. In the graph 600, the vertical axis 605a corresponds roughly to slewing angle and the horizontal axis 605b corresponds to time. Some events in the graph 600 do not require a defined pointing angle, such as the onboard maintenance event 630, but is represented as having a particular angle in the graph 600. This does not mean that a pointing angle is assigned to the onboard maintenance event 630 unless it is appropriate to do so. The horizontal length of the events in the graph can represent acceptable start times for the particular event. For example, image collection event 610a can have a defined duration corresponding to a time that the imaging satellite is over a targeted region on the Earth.

To construct a single graph 600, the scheduling module 104 can divide events into groups, where each group is represented by a different graph 600. To divide the groups, the scheduling module 104 can find gaps between events where consecutive events are not pair-wise constrained. For example, for a constellation of imaging satellites, the scheduling module 104 can collect all events to be performed over a week's time. For these events groups of events can be created where a division between one group and the next is defined as where the first event in one group is more than two minutes after last event in the predecessor group. Two minutes is used as an example of a maximum time for an imaging satellite to slew 180 degrees. This number may change under differing circumstances.

Figure 7:
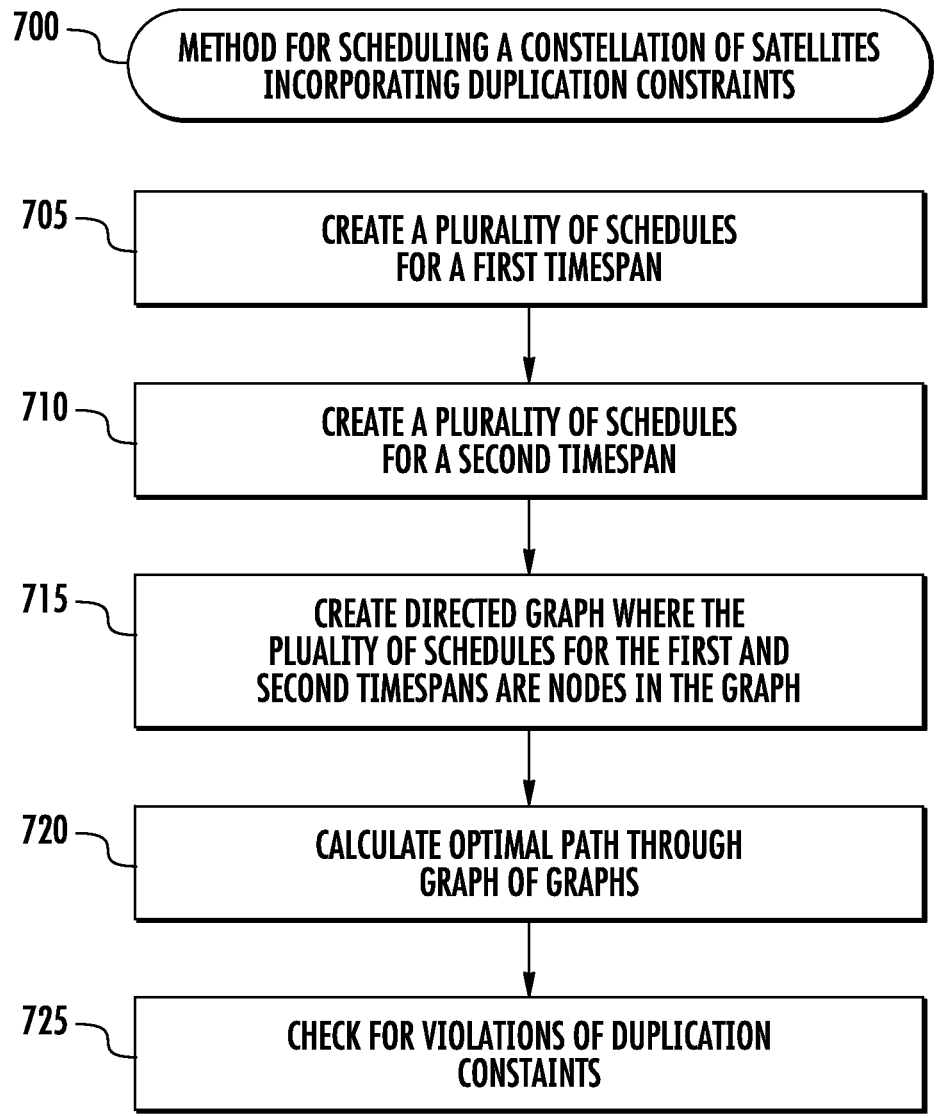
FIG. 7 illustrates a flow chart of an embodiment of a method for finding near-optimal schedules of events for a constellation of satellites subject to duplication constraints.
Figure 8:
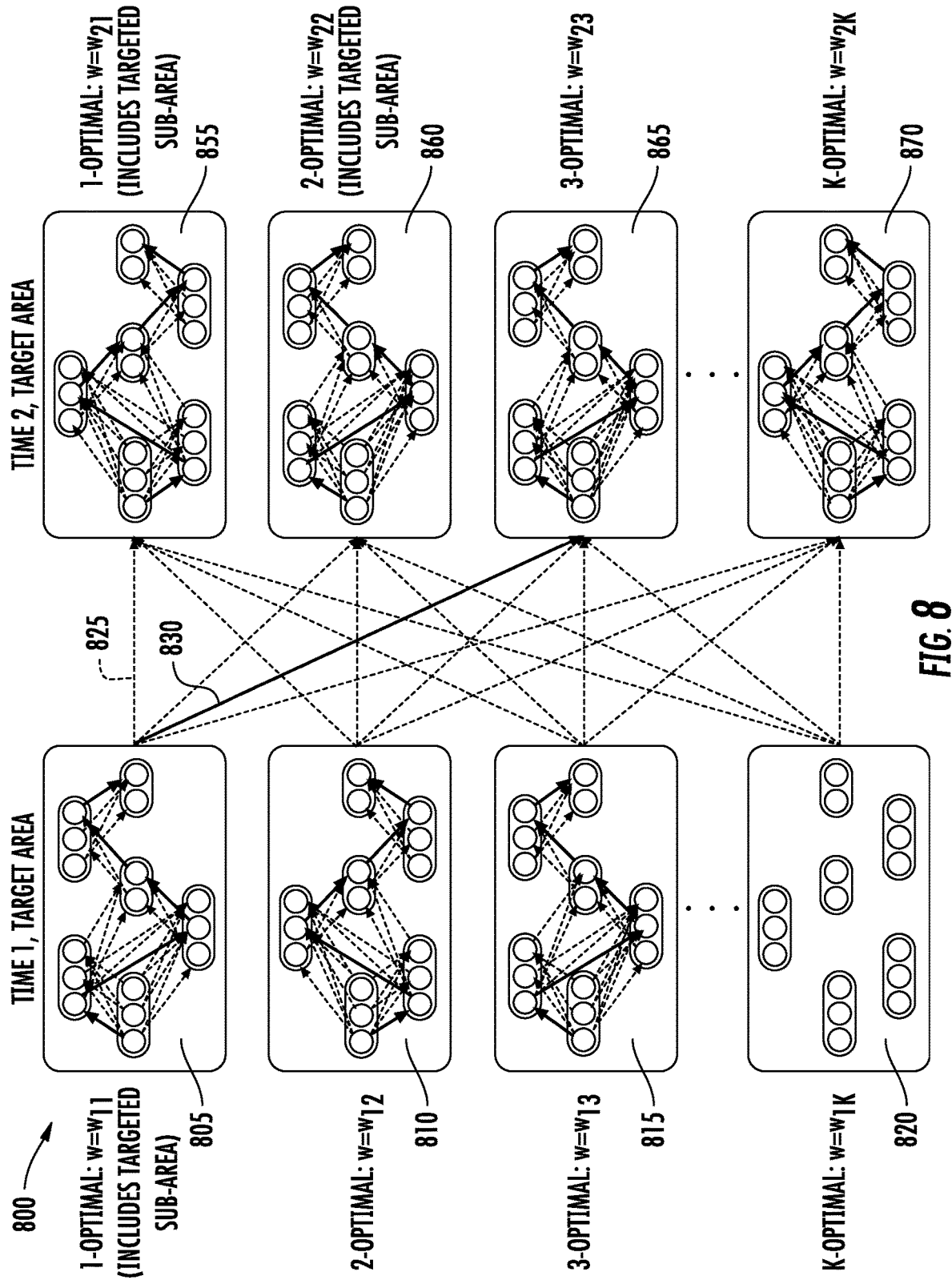
FIG. 8 illustrates an example graph of graphs showing a path through the graphs which increases utilization while avoiding undesirable duplication of events.

Example Embodiment of a System for Scheduling a Constellation of Imaging Satellites FIG. 7 illustrates a flow diagram of an example embodiment of a method 700 for finding near-optimal schedules of events for a constellation of satellites subject to duplication constraints. The method 700 includes creating a graph of graphs, finding an optimized path through the graph of graphs, and checking whether the optimized path violates duplication constraints. Duplication constraints can be limits on the number of times a certain event occurs over a particular timespan or within a constellation of satellites. For ease of description, the blocks in the method will be described as being performed by the scheduling module 104. Blocks in the method 700, however, can be performed by various systems or modules or combination thereof. In addition, throughout the description reference will be made to an example graph of graphs 800 as illustrated in FIG. 8.

In block 705, the scheduling module 104 creates a plurality of schedules for a first timespan. The plurality of schedules for the first timespan can be created using methods described herein, particularly the method 500 described herein with specific reference to FIG. 5. In addition to finding an optimal or near-optimal path as described herein, the scheduling module 104 can create multiple schedules having different values for a utilization function. In some embodiments, the scheduling module 104 finds the k most optimal paths through a particular graph, where k is an integer number greater than or equal to 1. The graphs can be ordered according to the value of the utilization function of that graph. For example, the graph with the highest-valued utilization function can be referred to as the 1-optimal schedule, the next highest-valued graph can be referred to as the 2-optimal schedule, and so on until the k-optimal schedule. Referring to FIG. 8, the graphs on the left-hand-side represent the k-optimal schedules as determined by the scheduling module 104. Each graph has a value associated with it, w, representing the value of the utilization function for that graph. For example, the 1-optimal graph has a value $w_{11}$ associated with it, the 2-optimal graph has a value $w_{12}$ associated with it, down to the k-optimal graph which has a value $w_{1k}$ associated with it, where $w_{11}$ is greater than or equal to $w_{12}$, $w_{12}$ is greater than or equal to $w_{13}$, and so on.

In block 710, the scheduling module 104 creates a plurality of schedules for a second timespan. The schedules from the second timespan can be created in parallel with the schedules from the first timespan and in parallel with each other.

In block 715, the scheduling module 104 creates a directed graph where schedules from the first and second timespan are nodes in the directed graph. The scheduling module 104 can connect the nodes with edges originating in graphs from the first timespan and terminating in graphs of the second timespan. In some embodiments, more than two timespans are used. The scheduling module 104 can repeat the procedure of finding schedules for a particular timespan and adding those schedules to the graph of graphs.

In block 720, the scheduling module 104 calculates an optimal path through the graph of graphs. Calculating the optimal path can include finding a path through the graph of graphs that maximizes the sum of the utilization scores of the individual graphs (e.g., $w_{ij}$). This procedure can be similar to procedures described herein, particularly as described with reference to FIG. 5.

In block 725, the scheduling module 104 checks for violations of duplication constraints. Duplication constraints can include limitations on a number of times an event appears in a schedule for a constellation of satellites or over defined timespans. For example, an imaging satellite can be tasked with collecting imagery of a targeted sub-area when it is over a targeted area. An imaging satellite can be over the targeted area at time 1 and at time 2, or different imaging satellites can be over the targeted area at time 1 and time 2. For each of time 1 and time 2, schedules are created for the imaging satellite(s) using methods described herein. It may be that the schedules produced for those timespans include collecting imagery of the targeted sub-area. However, taking duplicate imagery may not be a desirable use of the imaging satellite as it could be acquiring imagery of another location. In this example, a duplication constraint can be created that restricts the number of times imagery is collected for the targeted sub-area. Thus, the scheduling module 104 can check that the optimal path through the graph of graphs found in block 720 does not violate any duplication constraints.

In some embodiments, duplication constraints can be resolved by including sub-optimal schedules in the graph of graphs, as described above. For example, in FIG. 8 the 1-optimal graph 805 in time 1 includes an event to collect imagery of a targeted sub-area. The 1-optimal graph 855 and 2-optimal graph 860 in time 2 include events to collect imagery of the targeted sub-area as well. Therefore, to avoid violating a duplication constraint that limits the collection of imagery of the targeted sub-area to 1, the scheduling module 104 creates a schedule that connects 1-optimal graph 805 in time 1 to 3-optimal graph 865 in time 2, indicated by solid arrow 830.

In some implementations, the algorithm used to find the optimal path through the graph of graphs subject to duplication constraints can be represented as follows:

for i∈in-edges$_j$ do
    if dist$_i$+w$_{ij}$>dist$_j$ then
    if s$_j$∩S$_i$=Ø then
        dist$_j$←dist$_i$+w$_{ij}$
        prev$_j$←i
        S$_j$←s$_j$∪S$_i$
    end if
    end if
end for where, similar to the algorithm described above in reference to FIG. 5, optimization is achieved by looping through nodes and for each node, j, choosing the longest incoming cumulative path, dist$_j$. Here, the nodes are individual schedules or graphs. The set in-edges$_j$ is all the nodes that have edges originating in a different node and terminating in node j. This set is the closed set of nodes from which a predecessor node (prev$_j$) will be chosen for node j. The weights, $w_{ij}$, represent the overall score the schedule of the node that is the destination of the edge (e.g., $w_{ij}$ is the score of schedule s$_j$). The nodes, j, have the property, s$_j$, representing all the events that are included in the schedule represented by node j. The overall schedule up to and through node j is represented by S$_j$. In this formulation, the algorithm will string together the most optimal schedules while making sure to not repeat any events. This can be adjusted to allow for certain events to be duplicated, or allow duplication of events up to a defined number of repetitions. For example, to collect imagery over a region that is typically covered by clouds, duplication constraints can be set to allow multiple image collection events to be scheduled over that region to increase a probability that a satellite can acquire an image with a desired lack of cloud coverage. One result of this algorithm may be that locally sub-optimal schedules can be chosen to create a globally optimal schedule.

FIG. 8 illustrates an example graph of graphs 800 showing a path through the graphs which increases utilization while avoiding undesirable duplication of events. The graph of graphs 800 includes 1-optimal graph 805 for an imaging satellite during a first timespan over a targeted area which represents the optimal schedule for a first timespan as determined by the scheduling module 104. The 1-optimal graph 805 includes a schedule of events that includes collecting imagery of a targeted sub-area. The graph of graphs 800 includes sub-optimal graphs 810, 815, and 820 for the first timespan, where the sub-optimal graphs do not include an event to collect imagery of the targeted sub-area. The graph of graphs includes 1-optimal graph 855 and 2-optimal graph 860 for the imaging satellite (or a different imaging satellite) in a second timespan over the targeted area. The graphs 855 and 860 include events to collect imagery of the targeted sub-area. The graph of graphs 800 includes sub-optimal graphs 865 and 870 which do not include events to collect imagery of the targeted sub-area. Graphs from the first timespan are connected to graphs from the second timespan with edges 825. The optimal path that does not violate a duplication constraint dictating that imagery be collected once for the targeted sub-area is represented by the thick arrow pointing from 1-optimal graph 805 to 3-optimal graph 865. Each graph in the graph of graphs 800 includes a weight factor, wij, representing a utilization value based at least in part on the associated schedule. Finding the optimal path through the graph of graphs 800 can include maximizing the sum of the weights, wij, without violating duplication constraints.

Figure 9:
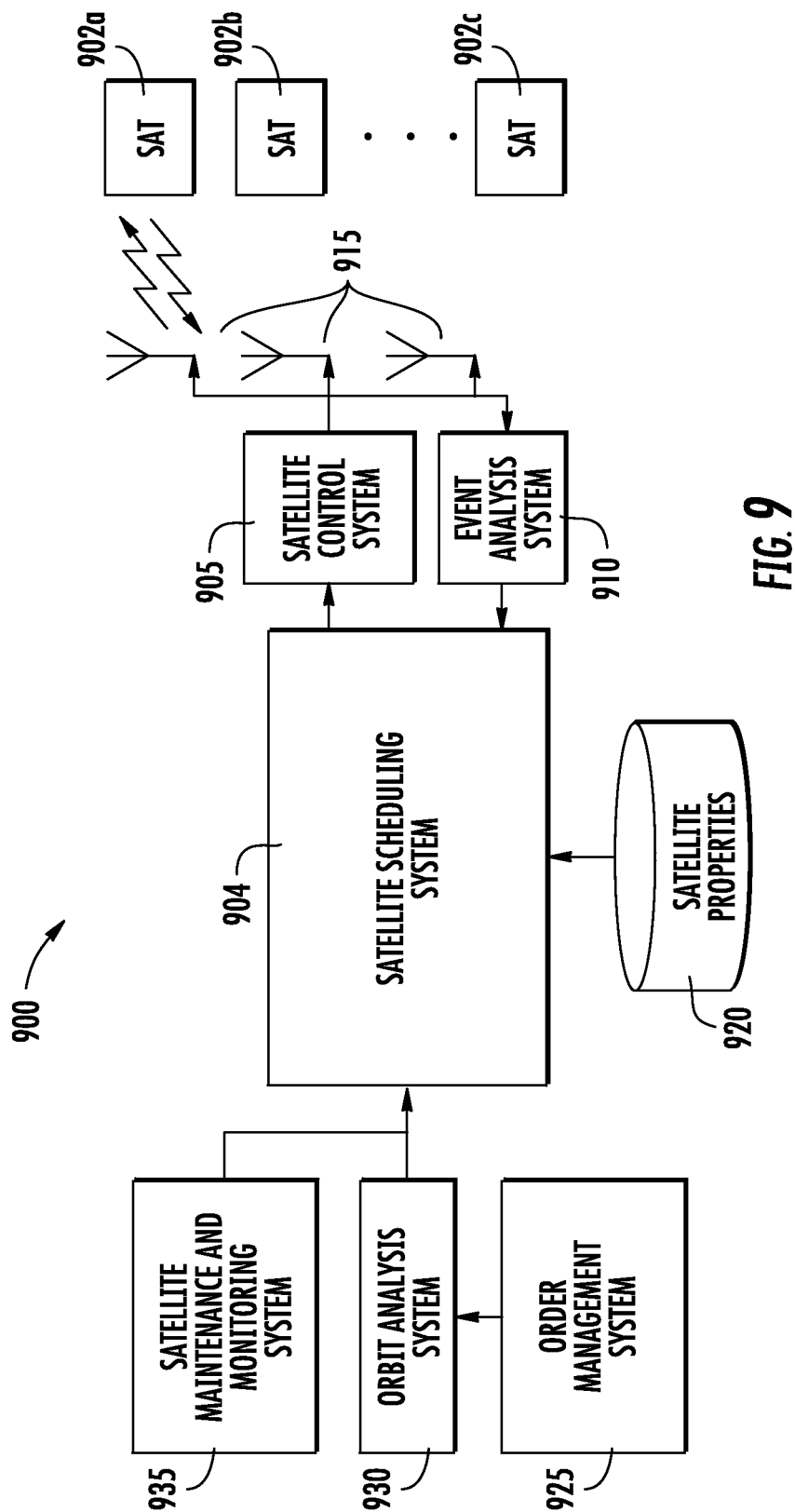
FIG. 9 illustrates a block diagram of an example system for scheduling a constellation of imaging satellites.

FIG. 9 illustrates a block diagram of an example system 900 for scheduling a constellation of satellites. The system 900 can receive orders from an order management system 925, analyze satellite schedules and satellite properties, and calculate a schedule using the satellite scheduling system 904 wherein the schedule is communicated to the satellites 902a, 902b, and 902c through a satellite control system 905 coupled to antennas 915.

The system 900 includes the order management system 925 configured to process event requests from control personnel, customers, external systems, remote systems, local systems, and the like. For example, the order management system 925 can be configured to receive orders for imagery collection from customers where an order can include desired parameters for the collection including geographic region, time frame, cloud cover, number of images, and the like. The order management system 925 can assign a priority value to the requested event for use in the satellite scheduling system 904. The order management system 925 can indicate that a requested event is critical so that the satellite scheduling system 904 can force the event to be included in any produced schedule. The order management system 925 can process received requests and transmit the processed requests to the orbit analysis system 930. The orbit analysis system 930 can analyze the various orbits of the satellites 902a, 902b, and 902c in the constellation to determine which satellites will be in the correct location to fulfill the request. This information can be transmitted to the satellite scheduling system.

The system 900 includes a satellite maintenance and monitoring system 935 configured to request maintenance or diagnostic events. These events can be regularly scheduled, requested upon satisfaction of defined criteria, or requested by a user through the maintenance and monitoring system 935. The maintenance and monitoring system 935 can transmit requests for onboard maintenance events to the satellite scheduling system 904. The transmitted events can include information about preferred pointing angle during the event, duration of the event, starting time of the event, other pertinent parameters, or any combination of these. The satellite maintenance and monitoring system 935 can indicate that an onboard maintenance event is critical so that the satellite scheduling system 904 can force the event to be included in any produced schedule.

The system 900 includes a satellite properties database 920 configured to satellite property information to the satellite scheduling system 904. Satellite properties stored in the database 920 can include information about constraints, such as agility constraints, temperature constraints, data storage constraints, energy constraints, duplication constraints, or any combination of these. The information about constraints can include operational limits and functions used to calculate the value of a parameter given a particular event. The satellite scheduling system 904 can retrieve information about satellites 902a, 902b, and 902c from the database 920 to produce optimal or near-optimal schedules for the constellation of satellites.

The system 900 includes satellite scheduling system 904 configured to find optimal or near-optimal schedules for a constellation of satellites given a list of requested events and satellite properties. The satellite scheduling system 904 can be a module similar to the scheduling module 104 and can incorporate similar components as described herein with reference to FIGS. 2-4. The satellite scheduling system 904 can employ any method described herein for producing optimal or near-optimal schedules, such as the example methods 500 and 700 described herein with reference to FIGS. 5 and 7. In addition, the control system 14 can implement optimal satellite scheduling with human collaboration using directed acyclic graphs according to example aspects of the present disclosure. In some embodiments, the satellite scheduling system 904 can achieve a schedule that is sufficiently close to the optimal solution using the methods described herein. In some embodiments, the satellite scheduling system 904 can produce near-optimal schedules using a directed graph-based approach about an order of magnitude faster than if it were to employ non-graph-based techniques. The satellite scheduling system 904 can be configured to compute a new schedule for one or more satellites 902a, 902b, and 902c upon receiving a new event request, updated constraints, or updated priority information.

The satellite scheduling system 904 can communicate schedule information to the satellite control system 905. The satellite control system 905 can convert the schedule information to control instructions which can be transmitted through antennas 915 to the appropriate satellite in the constellation, where the constellation can comprise one or more satellites, e.g., SAT-1 902a, SAT-2 902b, through SAT-N 902c. The satellite control system 905 can be a distinct system from the satellite scheduling system 904 and can be a remote system relative to the scheduling system 904.

The system 900 can include an event analysis system 910 to provide feedback about executed or missed events from the satellites 902a, 902b, and 902c. The satellite scheduling system 904 can receive this feedback from the event analysis system 910 and produce updated schedules based at least in part on this information.

Example Scheduling Using Human Collaboration

As discussed above, the scheduling module 104 according to example aspects of the present disclosure can determine a schedule of events using a directed acyclic graph using, for instance, the methods 500 and 700 discussed with reference to FIGS. 5 and 7. According to further example aspects of the present disclosure, the scheduling module 104 can take into account a user input relating to one or more changes in scheduled events in determining a schedule of events using the directed acyclic graph. For instance, the scheduling module 104 can add or subtract edges to the directed acyclic graph based at least in part on the user input.

More particularly, the use of directed acyclic graphs can allow a human manager of, for instance, a satellite system, to interact with a path solution to the directed acyclic graph and adapt it through user input. The user input can be mapped to changes in the directed acyclic graph (e.g. the addition or removal of edges) which can result to changes in identifying a near-optimal or optimal path through the directed acyclic graph. The near-optimal or optimal path can be used to determine an optimal schedule of events, for instance, for a constellation of satellites.

For instance, the satellite scheduling system 904 of FIG. 9 can be configured to find optimal or near-optimal schedules for a constellation of satellites given a list of requested events and satellites properties and given a user input requesting a change to the one or more of the requested events. More particularly, the satellite scheduling system 904 can have knowledge of the capabilities of the satellite via constraint models/edge encodings in the directed acyclic graph as well as relative priority of opportunities with respect to each other via importance weights in the directed acyclic graph. However, when it comes to assessing the presence/absence of temporal constraints on imaging, such as cloud cover obscuring a target, the satellite scheduling system 904 may be either unaware or cognitively inferior to a human manager of the satellite system.

According to particular aspects of the present disclosure, a human manager can have the ability to force out an event from the schedule of events. For instance, a human manager of an imaging satellite scheduling system 904 can force out an event from the schedule of events so that under no circumstances are any imaging opportunities of that event are used at the specified time. In this way, the satellite system can avoid wasted effort by taking an image that may be, for instance, cloudy, and instead replaces it with other opportunities where the expectation of successive imaging is higher.

Figure 10:
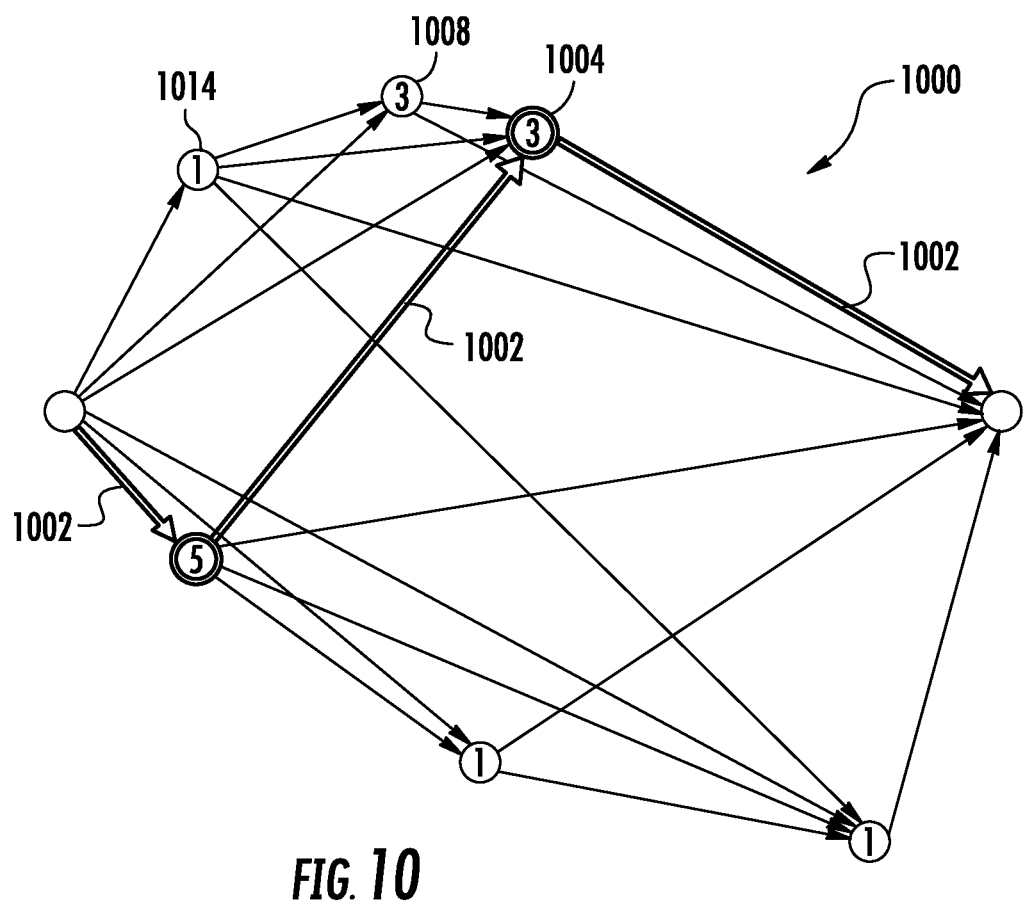
FIG. 10 depicts an example directed acyclic graph (DAG).

FIG. 10 depicts an example of a directed acyclic graph 1000 used, by for instance, a satellite scheduling system 904 to model events and constraints of an imaging satellite system. A highest weighted path can be determined through the directed acyclic graph using for instance, the methods 500 and/or 700 of FIGS. 5 and 7 respectively. The highest weighted path can be represented by bolded arrows 1002.

When a node is forced out due to, for instance, a user input requesting a change to the schedule of events, all edges in the directed acyclic graph terminating at the node can be disabled. More particularly, when a node j is force out based at least in part on, for instance, a user input relating to changes to an event request, all edges terminating at node j can be disabled. For instance, all edges $x_{i,j}$ are set to 0. As a result, the new near-optimal or optimal path through the graph no longer passes through the node that has been forced out.

Figure 11:
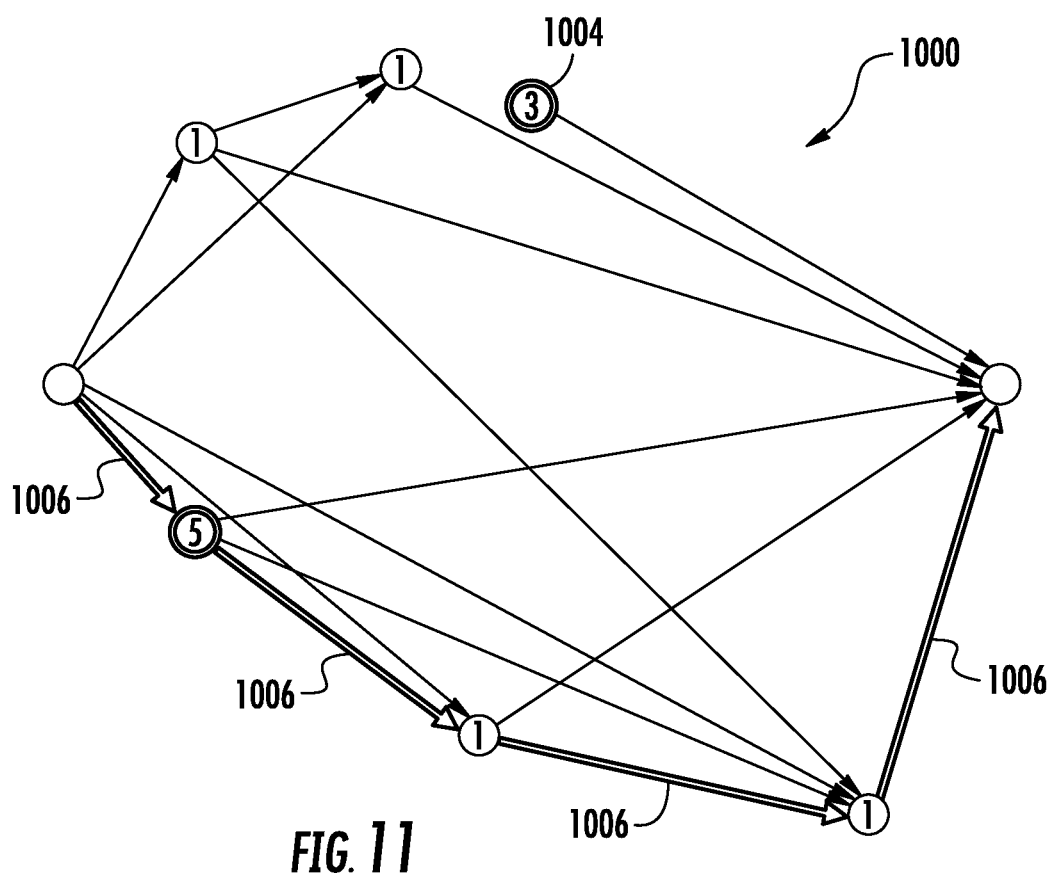
FIG. 11 depicts an example DAG after a node has been forced out.

For instance, FIG. 11 depicts the directed acyclic graph 1000 after a node has been forced out based on a user input. More particularly, node 1004 has been forced out as a result of user input relating to changes to one or more event requests. As shown, edges terminating in node 1004 have been removed. A new highest weighted path can be determined through the directed acyclic graph using, for instance, the methods 500 and/or 700 of FIGS. 5 and 7. The new highest weighted path is represented by bolded arrows 1006. As shown, the new highest weighted path does not pass through node 1004.

According to example aspects of the present disclosure, a human manager can have the ability to force in an event to the schedule of events. For instance, a human manager of an imaging satellite scheduling system 904 can force in an event so that it is included in the schedule of events. For example, while importance weights can be assigned to various events to represent their relative importance, there may be cases where a specific event is off the absolute highest importance but must be included in the schedule of opportunities. An example can be a breaking news event for which imaging from a satellite is desired. Alternatively, an existing low importance event can temporarily be desired for immediate fulfillment. A human manager may be best capable of deciding when an event should be forced in to the schedule of events, so that the event is guaranteed to be included in the schedule.

When a node is forced in due to, for instance, a user input requesting a change to the schedule of events, all edged that "cross" the node can be disabled. More particularly, when node j is forced in, all edges $x_{i,j}$ are set to 0 where node i is chronologically earlier than node j and node k is chronologically later than node j. As a result, an optimal or near-optimal path through the graph is forced to pass through the node that has been forced in.

Figure 12:
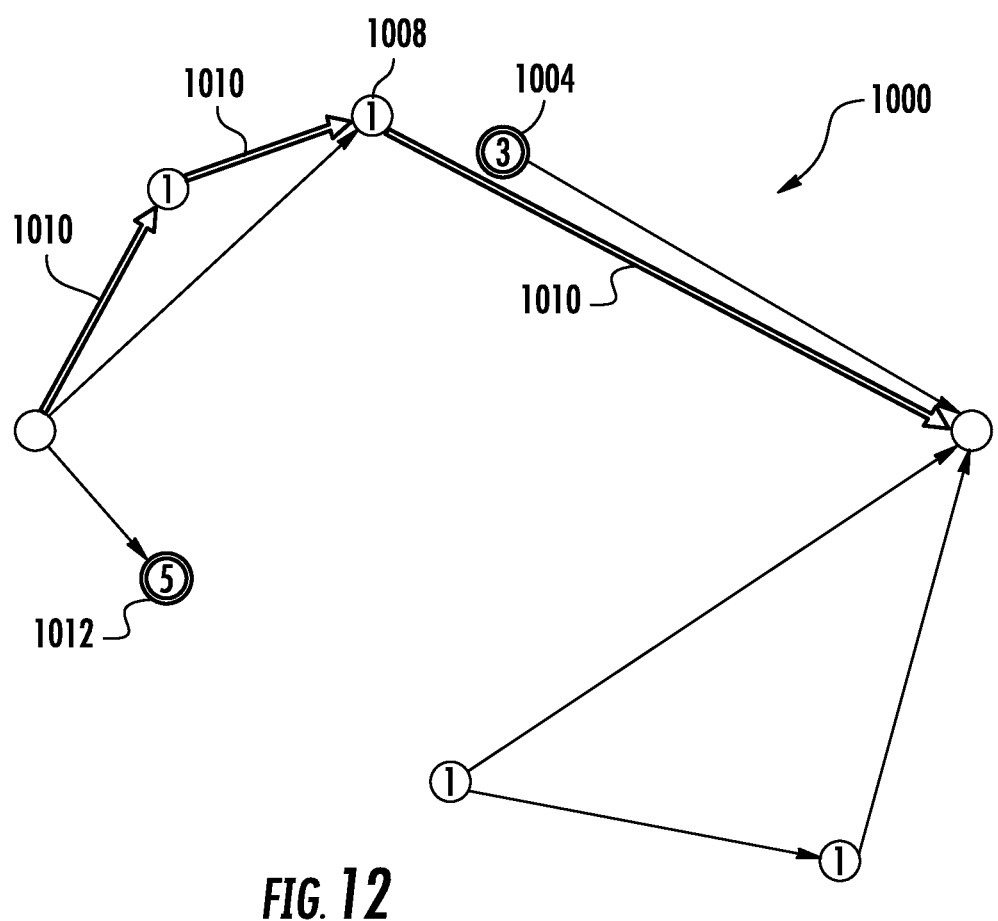

For instance, FIG. 12 depicts the directed acyclic graph 1000 after a node has been forced in based on a user input. More particularly, node 1008 has been forced in as a result of user input relating to changes to one or more event requests. As shown, all edges running from nodes earlier than (to the left of) the forced in node to nodes later than (to the right of) forced in node have been removed. A new highest weighted path can be determined through the directed acyclic graph using, for instance, the methods 500 and/or 700 of FIGS. 5 and 7. The new highest weighted path is represented by bolded arrows 1010. As shown, the highest weighted pass no longer passes through node 1004 or node 1012, which may be higher priority nodes.

Example Processing of Directed Acyclic Graphs Based at Least in Part on Identification of Dominant Edges Various enhancements can be made to the processing of directed acyclic graphs to determine a schedule of events according to example aspects of the present disclosure, such as the example methods 500 and/or 700 of FIGS. 5 and 7. In one example embodiment, processing the directed acyclic graphs can include identifying dominant edges in the directed acyclic graph and removing or not traversing the dominant edges of the directed acyclic graph as such dominant edges are determined to not be a part of the optimal or near-optimal path through the graph. In this way, the directed acyclic graph can be processed in a manner that can save memory and/or computing time.

More particularly, a property of the use of directed acyclic graphs in determining a schedule of events can include the transitive nature of edges in the graph. For instance, referring to FIG. 10, if there is an edge from node 1014 to node 1008 (representing, for instance, a feasible slew), and there is an edge from node 1008 to node 1004 (representing, for instance, a feasible slew), then there will be an edge from node 1014 to node 1004 since that slew must also be feasible.

Given a few properties of the scheduling problem, it is observed that such edges (those connecting two nodes for which there is also a connecting path stopping at one or more intermediate nodes) are always dominated and are typically never a part of the optimal or near-optimal path through the directed acyclic graph.

First, the weights $w_i$ are assed at the nodes, so all edges that terminate at the same node will add the same weight to the overall cumulative weight. In the example directed acyclic graph 1000 of FIG. 10, the act of traversing from node 1008 to node 1004 and the act of traversing from node 1014 to node 1004 provide the same added weight $w_{1004}$.

Second, the weights are non-negative, so the addition of a preceding edge before node 1008 to node 1014 (e.g. node 1014 to node 1008) will add a weight $w_{1008}>0$. Therefore, the path from node 1014 to node 1004 that stops at node 1008 will always have greater weight that the path including the edge from node 1014 to node 1004.

According to example aspects of the present disclosure, dominant edges that connect two nodes for which there is also connecting path stopping at one or more intermediate nodes can be identified. These edges are not traversed and/or are disabled or removed from the directed acyclic graph during processing. The skipping or removal of these edges will not affect the identification of the near-optimal or optimal path and can result in saving computation time and storage space. The graph with such dominant edges removed can be the transitive reduction of the directed acyclic graph and can be computed in polynomial time.

An example memory (storage space) and computational time reduction for scheduling events using a directed acyclic graph can be achieved using the topology of the nodes in the directed acyclic graph. More particularly, a satellite can physically slew from any orientation to another orientation in finite time. That is, an agility model $f_{agility}$ () can have an upper bound. There is some duration of time $t_{max-slew}$ above which the satellite is guaranteed to be able to slew between two events, no matter the orientation required.

A space reduction is possible by not explicitly enumerating an edge between two nodes in the directed acyclic graph that are separated (chronologically) by more than $t_{max-slew}$. Rather, when optimizing for the highest weighted incoming path to a node j, the "for" loop over all incoming edges can consider both explicitly enumerated edges as well as temporarily generated edges from previous nodes that are more than $t_{max-slew}$ in the past. Because of the transitive properties of the directed acyclic graph, a time reduction is possible by disabling or not traversing edges to nodes that are more than $2t_{max-sew}$ in the past as there will typically always be a higher weighted more desirable path to node j.

Example Processing of Directed Acyclic Graphs Based at Least in Part on Imaging and Downlinking Constraints As discussed above, a scheduling module 104 according to example aspects of the present disclosure can generate a schedule of events using a directed acyclic graph generated based at least in part on pair-wise constraints and cumulative constraints. For instance, the scheduling module 104 can process the directed acyclic graph using, for instance, the methods 500 and/or 700 of FIGS. 5 and 7. One example cumulative constraint taken into account during processing of a directed acyclic graph can include a data capacity constraint.

Data capacity limitations can refer to limits on the imaging satellite in terms of storing bits of data and transmitting the bits of data to a receiving station. Data capacity limitations can refer to an amount of onboard storage on the imaging satellite. Data capacity limitations can refer to an operational constraint that forces the imaging satellite to transmit all stored data to a receiving station during a data transmission event. Data capacity limitations are cumulative constraints because a history of prior events determines whether a data capacity limitation would be violated. For example, if onboard storage is nearing maximum capacity, attempting to store an additional image acquisition could require more data storage than is available. The additional image acquisition event would therefore violate the cumulative constraint.

A satellite scheduling system 904 can seek to determine optimal and near-optimal schedules of events by taking into account cumulative constraints based on data capacity to not exceed a limit on overall data capacity for one or more satellites. One aspect of determining a schedule of events for a constellation of satellites is that the satellite scheduling system 904 can consider multiple types of events, such as imaging events that increase the amount of data as well as downlinking events that decrease the amount of data.

Downlinking events can involve transferring imagery collected by the constellation of satellites to the ground for processing. In addition, downlinking events increase data capacity on satellites in the constellation of satellites. However, the time spent downlinking imagery is time not spent collecting images. As a result, it is desirable to make the downlink duration as short as possible while keeping the satellite "capacity neutral."

According to example aspects of the present disclosure, weights for downlink events can be determined to reduce time spent downlinking while keeping satellites capacity neutral. More particularly, each downlink event can be discretized into several potential pointing events that occur at different times $t_j$ and also for different durations $\tau_j$. For each potential downlink event j the importance weight $w_j$ can be dynamically determined based at least in part by the time necessary to downlink everything onboard the satellite (calculated from $d(t_j)$ and the time available to downlink $\tau_j$.

According to particular implementations, the dynamic weight can be determined as a heuristic such that the closer the available time duration to the necessary duration (to downlink everything), the higher the importance weight and such that a downlink that is longer than required is always weighted higher than a downlink that is shorter than required. In addition, the importance weight can be finite so that the downlink events can be separated from imaging events by applying an order of magnitude difference to their respective weights.

Conclusion

Examples of scheduling systems and associated components and methods are described herein. The figures show various systems and modules and connections between them. The various modules and systems can be combined in various configurations and connections between the various modules and systems can represent physical or logical links. The representations in the figures have been presented to clearly illustrate the principles of how to produce desirable schedules in a relatively quick and efficient manner, and details regarding divisions of modules or systems have been provided for ease of description rather than attempting to delineate separate physical embodiments. The disclosure also describes use of human collaboration with the scheduling engine (e.g., via incorporation of human actions into directed acyclic graphs). The examples and figures are intended to illustrate and not to limit the scope of the inventions described herein. For example, the principles herein may be applied to a constellation of satellites wherein satellites include communication satellites, imaging satellites, Earth observation satellites, navigational satellites, weather satellites, or other types of satellites. The satellites can be any of a variety of sizes such as large satellites, medium satellites, mini-satellites, micro-satellites, nano-satellites, pico-satellites, and the like. The principles disclosed herein may be applied to systems that do not comprise a constellation of imaging satellites such as, e.g., air traffic control systems, vehicle routing systems, and so forth.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Each of the processes, methods, and algorithms described herein and/or depicted in the attached figures (including figures in the appendices) may be embodied in, and fully or partially automated by, code modules executed by one or more physical computing systems, computer processors, application-specific circuitry, and/or electronic hardware configured to execute computer instructions. For example, computing systems can include general or special purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or circuitry or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer or software product or packaged into multiple computer or software products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for controlling a constellation of imaging satellites, the system comprising:
   memory configured to store satellite properties information corresponding to characteristics of one or more imaging satellites in the constellation of imaging satellites;
   one or more computing devices in communication with the memory, the one or more computing devices configured to execute instructions that cause the one or more computing devices to perform operations, the operations comprising:
      producing or receiving requests for an image collection event;
      identifying one or more imaging satellites in the constellation of imaging satellites which will be positioned over a region suitable to perform a requested image collection event;
      receiving event requests comprising one or more imaging events and one or more downlink events, and the satellite properties information and user input relating to changes to one or more of the event requests;
      producing a near-optimal schedule of events that does not violate constraints of the constellation of imaging satellites, the near-optimal schedule taking into account at least in part the received user input and comprising one or more scheduled events, wherein the scheduled events include the one or more imaging events and the one or more downlink events, wherein producing the near-optimal schedule of events comprises:
         accessing a directed acyclic graph, wherein the directed acyclic graph comprises one or more first nodes representative of the one or more imaging events and one or more second nodes representative of the one or more downlink events,
         traversing a path through the directed acyclic graph such that a set of dominated edges are not traversed or removed from the directed acyclic graph, the near-optimal schedule of events comprising a highest weighted path through the directed acyclic graph, and
         applying a respective weight to each of the one or more imaging events and the one or more downlink events, wherein each respective weight is indicative of a priority of the imaging event or downlink event for inclusion in the near-optimal schedule of events, a higher weight indicating that the associated imaging event or downlink event is to be given a higher priority for inclusion in the near-optimal schedule of events than an imaging event or downlink event with a lower priority, wherein weights for the one or more downlink events are higher than weights for the one or more imaging events, wherein the weights for the one or more downlink events are determined based, at least in part, on a time to downlink all images;
      converting the near-optimal schedule of events into one or more control instructions for transmission to the one or more imaging satellites in the constellation of imaging satellites; and
   communicating with the one or more imaging satellites to initiate a performance of the one or more scheduled events based at least in part on the one or more control instructions, wherein the performance of the one or more scheduled events comprises a performance of the one or more downlink events which increase available data storage for the one or more imaging satellites.

2. The system of claim 1, wherein the satellite scheduling system is configured to take into account at least in part the received user input by disabling edges in the directed acyclic graph based at least in part on the user input.

3. The system of claim 2, wherein edges terminating at a node associated with the user input are disabled to force out an event from the schedule of events.

4. The system of claim 2, wherein edges crossing a node associated with the user input are disabled to force in an event from the schedule of events.

5. The system of claim 1, wherein edges of the directed acyclic graph are determined to not be part of the longest path through the directed acyclic graph are not traversed or are removed from the directed acyclic graph.

6. The system of claim 1, wherein weights for the one or more downlink events in the directed acyclic graph are determined based at least partly on a time available to perform a downlink.

7. A method of controlling a constellation of imaging satellites, the method comprising:
   receiving, by one or more computing devices, a request for an image collection event;
   identifying, by the one or more computing devices, one or more imaging satellites in the constellation of imaging satellites which will be positioned over a region suitable to perform a requested image collection event;

receiving, by the one or more computing devices, data indicative of a plurality of event requests comprising one or more imaging events and one or more downlink events, and data indicative of satellite properties;

receiving, by the one or more computing devices, data indicative of user input relating to changes to one or more of the event requests;

producing, by the one or more computing devices, a near-optimal schedule of events that does not violate constraints of the constellation of imaging satellites, the near-optimal schedule taking into account at least in part the user input relating to changes to one or more of the event requests and comprising one or more scheduled events, wherein the scheduled events include the one or more imaging events and one or more downlink events, wherein producing the near-optimal schedule of events comprises:

accessing a directed acyclic graph, wherein the directed acyclic graph comprises one or more first nodes representative of the one or more imaging events and one or more second nodes representative of the one or more downlink events, traversing a path through the directed acyclic graph such that a set of dominated edges are not traversed or removed from the directed acyclic graph, the near-optimal schedule of events comprising a highest weighted path through the directed acyclic graph, and applying a respective weight to each of the one or more imaging events and the one or more downlink events, wherein each respective weight is indicative of a priority of the imaging event or downlink event for inclusion in the near-optimal schedule of events, a higher weight indicating that the associated imaging event or downlink event is to be given a higher priority for inclusion in the near-optimal schedule of events than an imaging event or downlink event with a lower priority, wherein weights for the one or more downlink events are higher than weights for the one or more imaging events, wherein the weights for the one or more downlink events are determined based, at least in part, on a time to downlink all images;

converting, by the one or more computing devices, the near-optimal schedule of events to one or more control instructions for transmission to one or more imaging satellites in the constellation of imaging satellites; and communicating, by the one or more computing devices, with the one or more imaging satellites in the constellation of imaging satellites to initiate a performance of the one or more scheduled events using the one or more control instructions, wherein the performance of the one or more scheduled events comprises performance of the one or more downlink events.

8. The method of claim 7, wherein producing, by the one or more computing devices, the near-optimal schedule of events comprises disabling, by the one or more computing devices, edges in the directed acyclic graph based at least in part on the user input.

9. The method of claim 8, wherein edges terminating at a node associated with the user input are disabled to force out an event from the schedule of events.

10. The method of claim 8, wherein edges crossing a node associated with the user input are disabled to force in an event from the schedule of events.

11. The method of claim 7, wherein edges of the directed acyclic graph are determined to not be part of the longest path through the directed acyclic graph are not traversed or are removed from the directed acyclic graph.

12. The method of claim 7, wherein weights for the one or more downlink events in the directed acyclic graph are determined based at least partly on a time available to perform a downlink.

* * * * *